(12) United States Patent
Kamada

(10) Patent No.: US 9,543,877 B2
(45) Date of Patent: Jan. 10, 2017

(54) CONTROL APPARATUS FOR A SWITCHED RELUCTANCE MOTOR

(71) Applicant: DENSO CORPORATION, Kariya, Aichi-pref. (JP)

(72) Inventor: Yoshinobu Kamada, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 355 days.

(21) Appl. No.: 14/193,270

(22) Filed: Feb. 28, 2014

(65) Prior Publication Data

US 2014/0239857 A1 Aug. 28, 2014

(30) Foreign Application Priority Data

Feb. 28, 2013 (JP) .................................. 2013-039959
Oct. 22, 2013 (JP) .................................. 2013-218851

(51) Int. Cl.
*H02P 25/092* (2016.01)

(52) U.S. Cl.
CPC .................................. *H02P 25/092* (2016.02)

(58) Field of Classification Search
CPC .......................................................... H02P 6/14
See application file for complete search history.

(56) References Cited

U.S. PATENT DOCUMENTS

| | | | | |
|---|---|---|---|---|
| 4,047,083 A * | 9/1977 | Plunkett | ............... | H02M 7/527 318/807 |
| 5,589,752 A | 12/1996 | Iwasaki et al. | | |
| 5,936,386 A * | 8/1999 | Heglund | ............... | H02P 25/092 318/701 |
| 6,014,003 A * | 1/2000 | French | ............... | H02P 25/0925 318/254.2 |
| 8,489,262 B2 * | 7/2013 | Yamasaki | ............. | B60L 15/025 318/400.02 |
| 2002/0153858 A1* | 10/2002 | Schulz | ................... | H02P 25/092 318/701 |
| 2002/0195981 A1* | 12/2002 | Sakai | ...................... | H02P 6/085 318/400.01 |

(Continued)

FOREIGN PATENT DOCUMENTS

| | | |
|---|---|---|
| JP | 07-167928 | 7/1995 |
| JP | 07-298669 | 11/1995 |

(Continued)

OTHER PUBLICATIONS

Office Action (3 pages) dated Mar. 31, 2015 issued in corresponding Japanese Patent Application No. 2013-218851 and English translation (6 pages).

(Continued)

*Primary Examiner* — Shawki S Ismail
*Assistant Examiner* — Muhammad S Islam
(74) *Attorney, Agent, or Firm* — Nixon & Vanderhye PC

(57) ABSTRACT

An apparatus for controlling a switched reluctance motor with use of a power conversion circuit. In the apparatus, a command voltage setter sets a command voltage for a coil of the motor, where the command voltage is set to change gradually during either or both of a ramp-up period and a ramp-down period of the command voltage. A voltage controller controls an applied voltage to the coil to the command voltage set by the command voltage setter by operating the power conversion circuit.

19 Claims, 32 Drawing Sheets

(56) References Cited

U.S. PATENT DOCUMENTS

| | | | |
|---|---|---|---|
| 2006/0001392 A1* | 1/2006 | Ajima | B62D 5/046 |
| | | | 318/432 |
| 2009/0302792 A1 | 12/2009 | Osada et al. | |
| 2012/0139460 A1* | 6/2012 | Senkou | H02P 21/0096 |
| | | | 318/400.02 |
| 2013/0234638 A1* | 9/2013 | Tanaka | H02P 25/22 |
| | | | 318/400.27 |
| 2014/0292244 A1 | 10/2014 | Kamada | |

FOREIGN PATENT DOCUMENTS

| | | |
|---|---|---|
| JP | 2001-197774 | 7/2001 |
| JP | 2001-238484 | 8/2001 |
| JP | 3255167 | 11/2001 |
| JP | 2002-199769 | 7/2002 |
| JP | 2007-166830 | 6/2007 |
| JP | 2009-303298 | 12/2009 |
| JP | 2012-050297 | 3/2012 |
| JP | 2014-200147 | 10/2014 |
| JP | 2014-220985 | 11/2014 |

OTHER PUBLICATIONS

Office Action (3 pages) dated Nov. 24, 2015 issued in corresponding Japanese Patent Application No. 2013-218851 and English translation (4 pages).

* cited by examiner

APPLIED VOLTAGE: POSITIVE

APPLIED VOLTAGE: NEGATIVE

PWM VOLTAGE CONTROL
(IDEAL SINUSOIDAL WAVE)

PWM VOLTAGE CONTROL
(SINUSOIDAL WAVE, fc=80KHZ)
(fc=80kHz)

PWM VOLTAGE CONTROL
(SINUSOIDAL WAVE, fc=20KHZ)
(fc=20kHz)

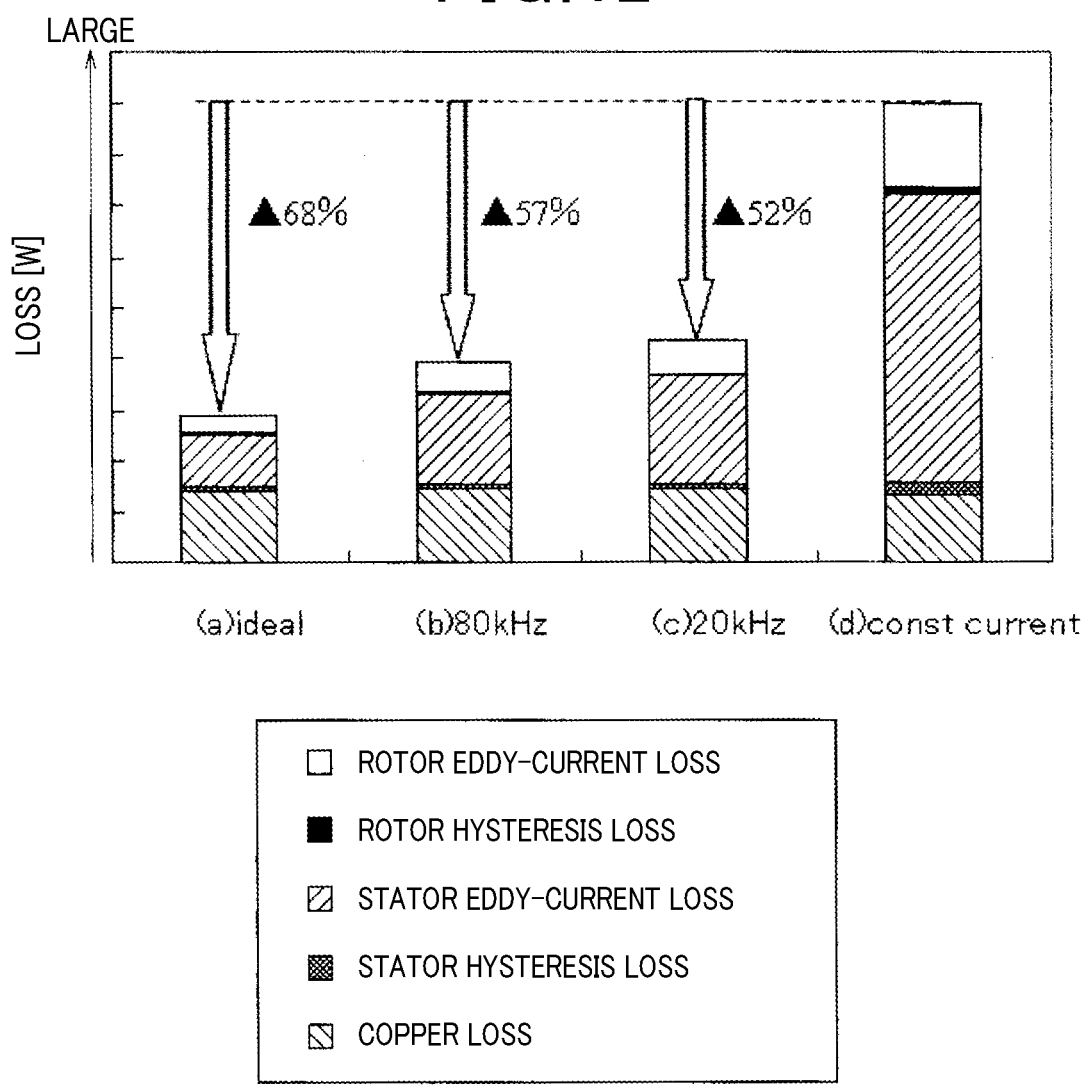

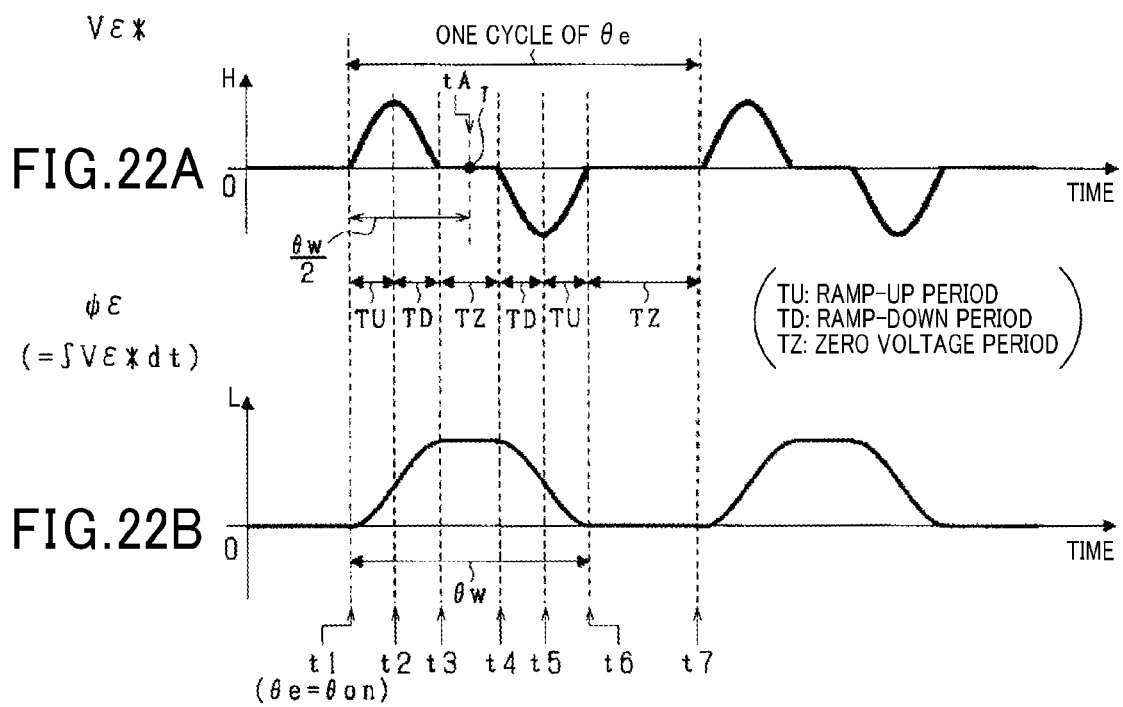

FIG.23A v 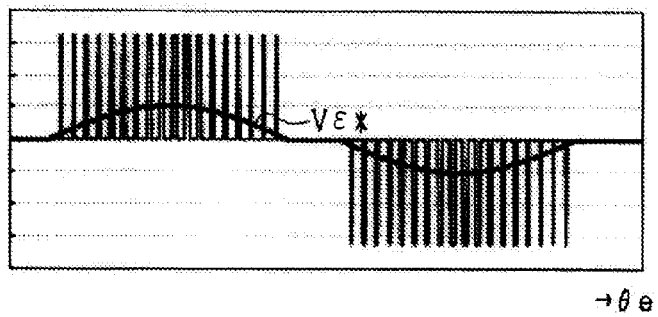
FIG.23B i 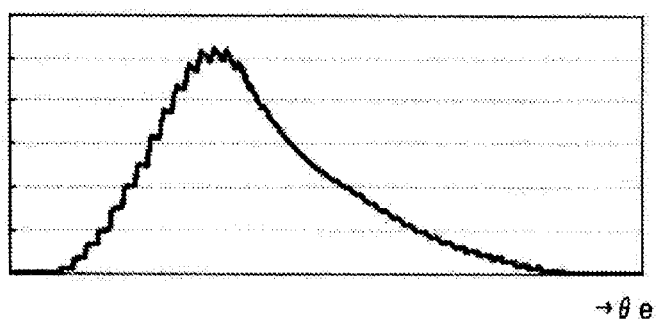
FIG.23C φ 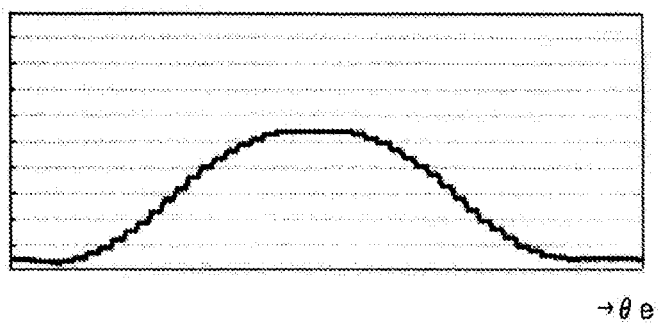
FIG.23D L 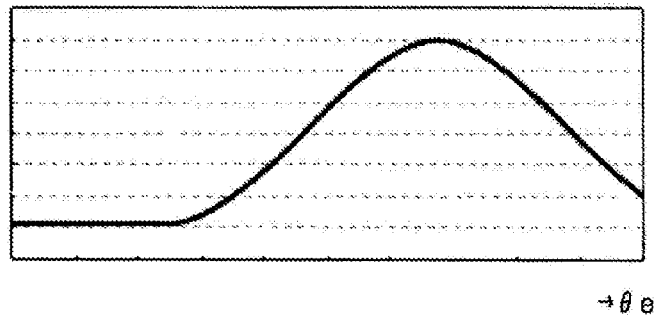

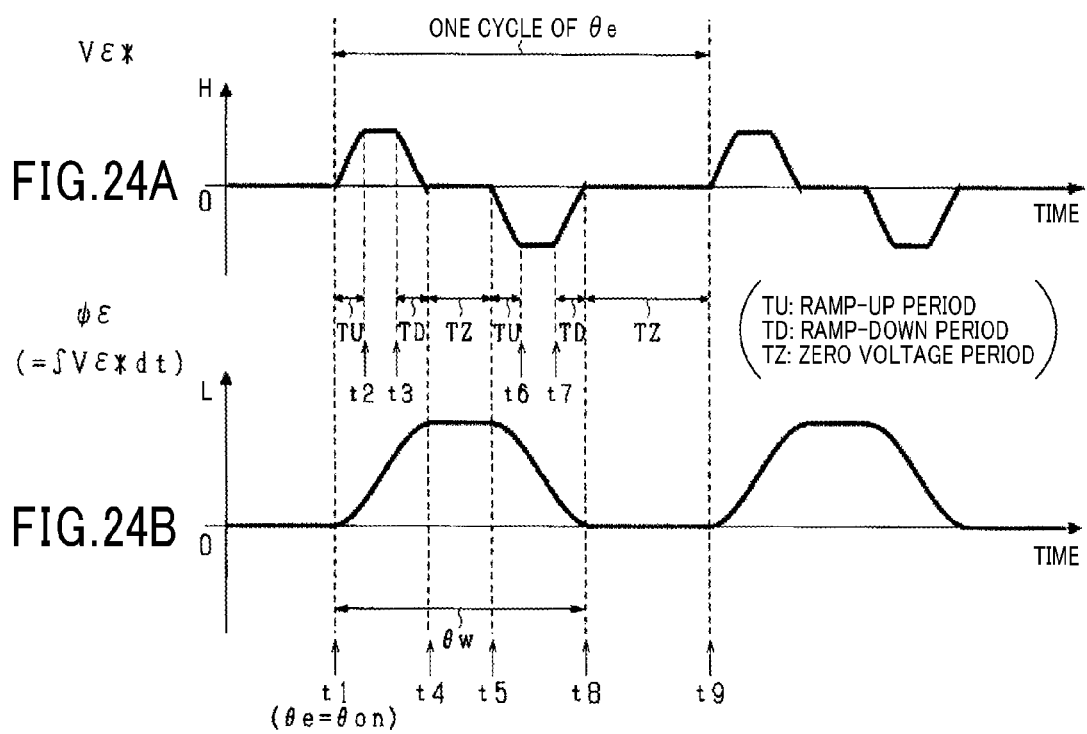

FIG.25A  v
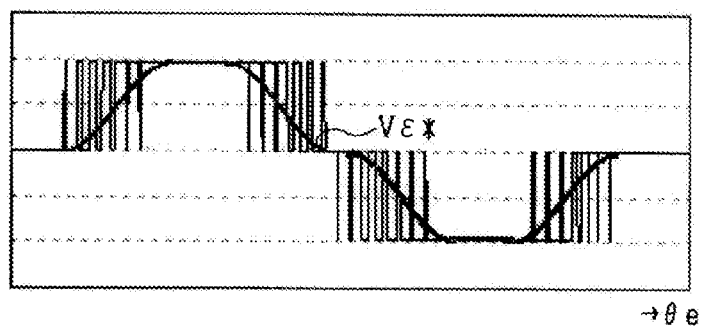
FIG.25B  i
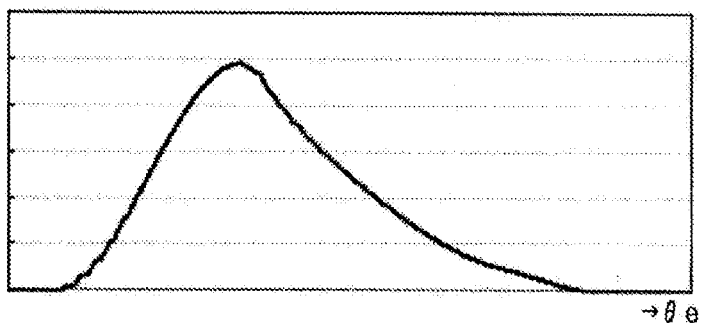
FIG.25C  φ
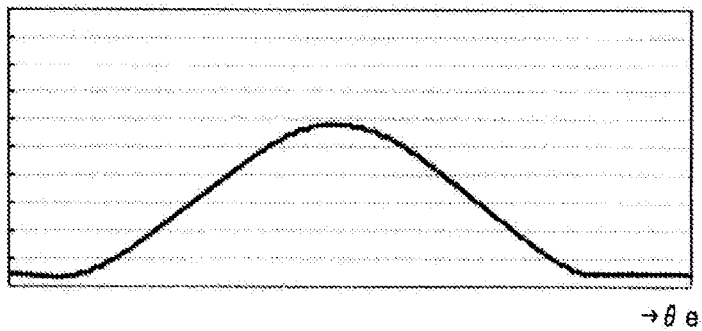
FIG.25D  L
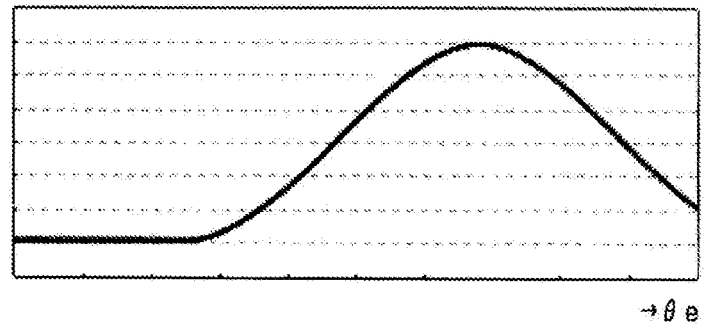

FIG.28A  v
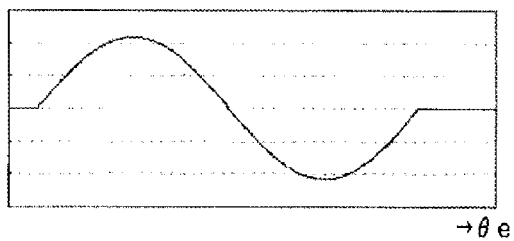
FIG.28B  i
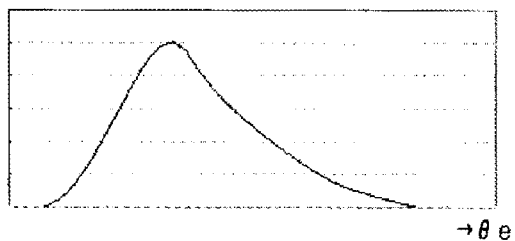
FIG.28C  $\phi$
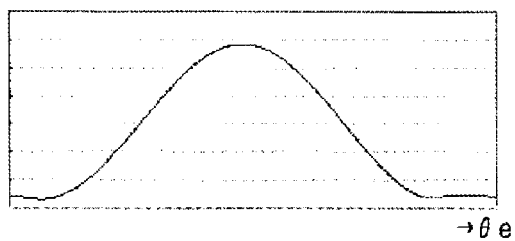
FIG.29A
FIG.29B
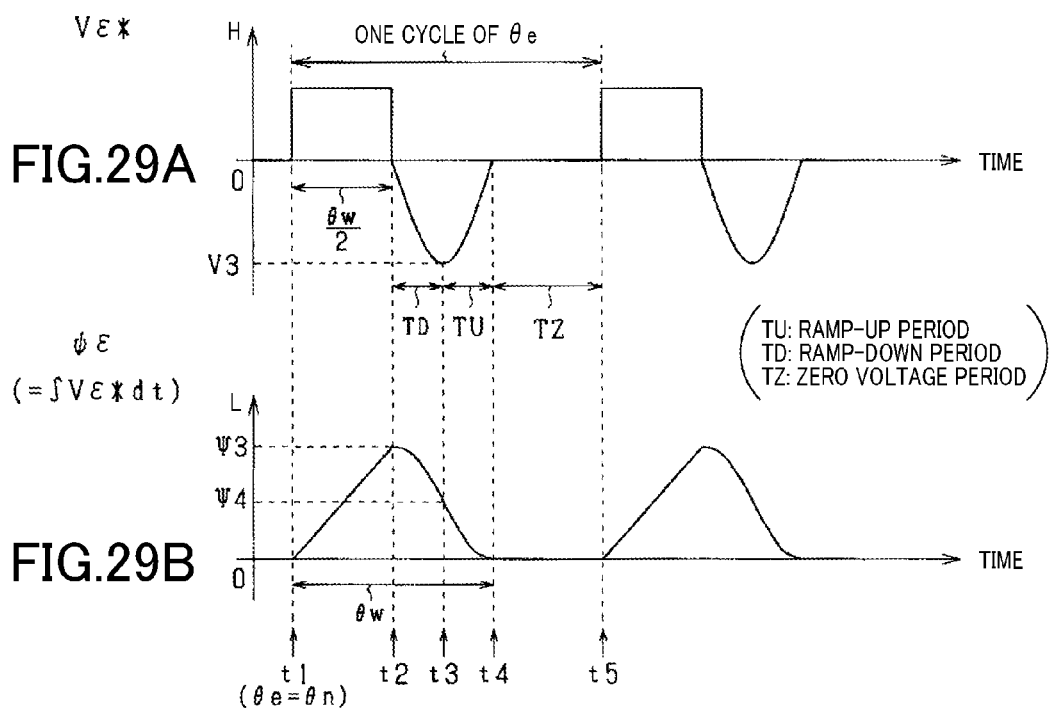

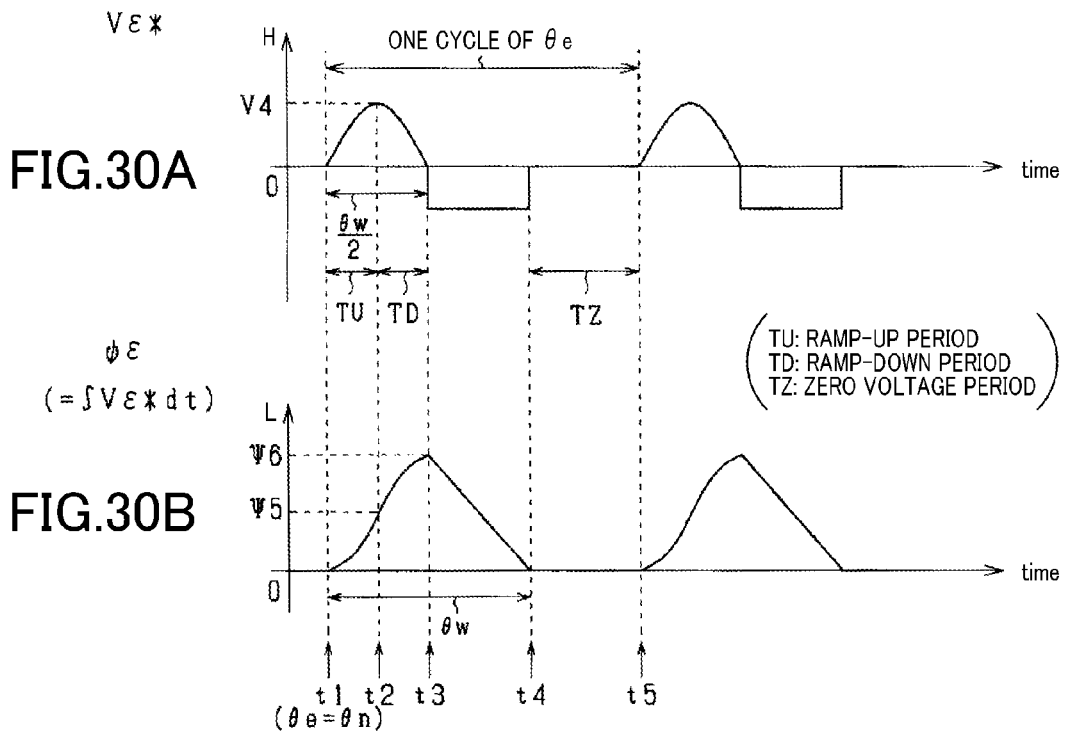
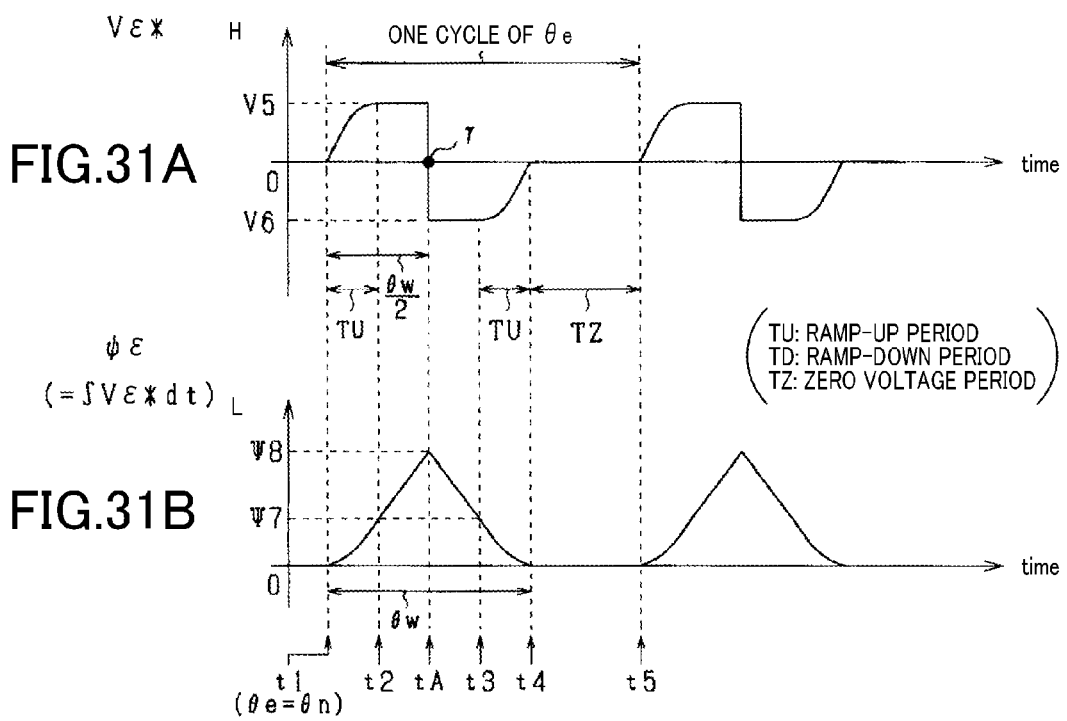

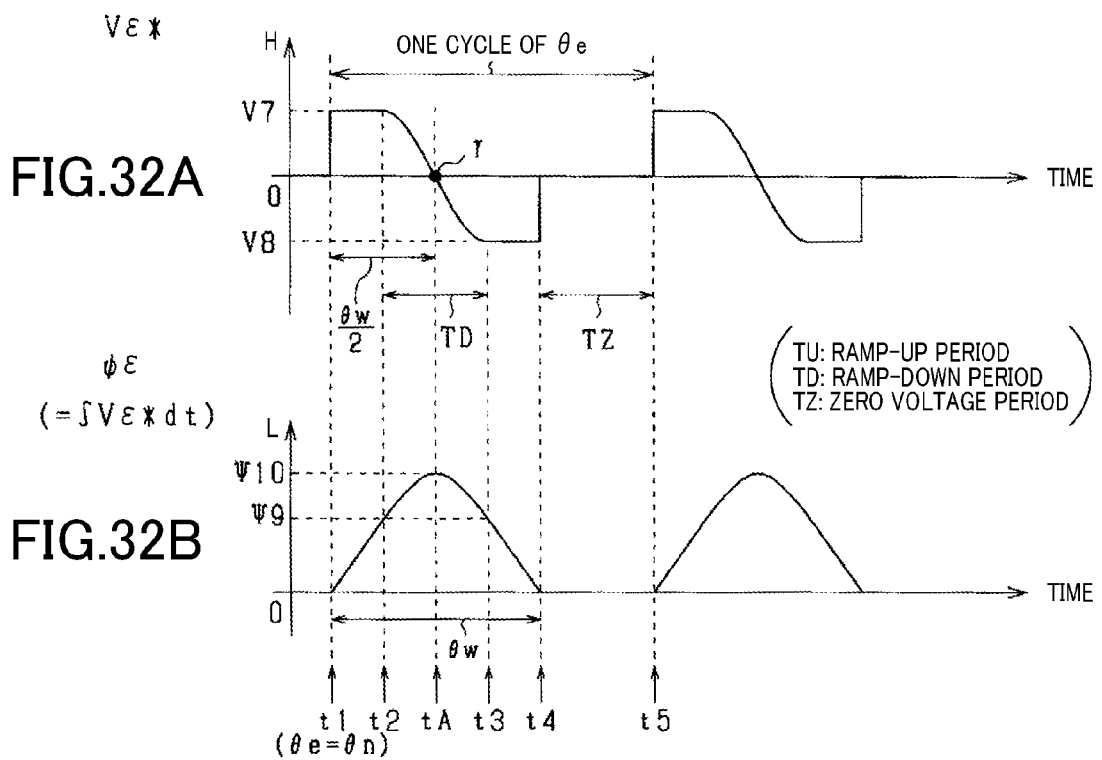

FIG. 35
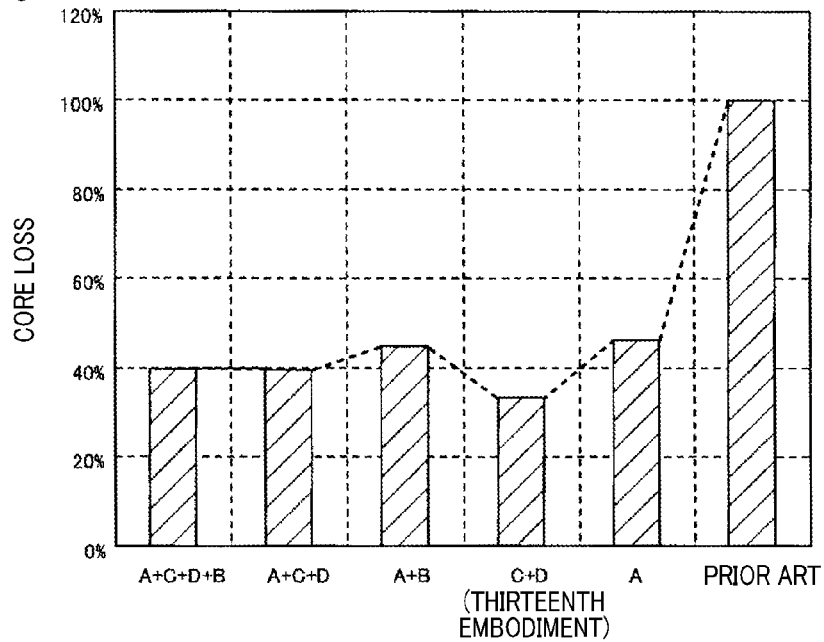
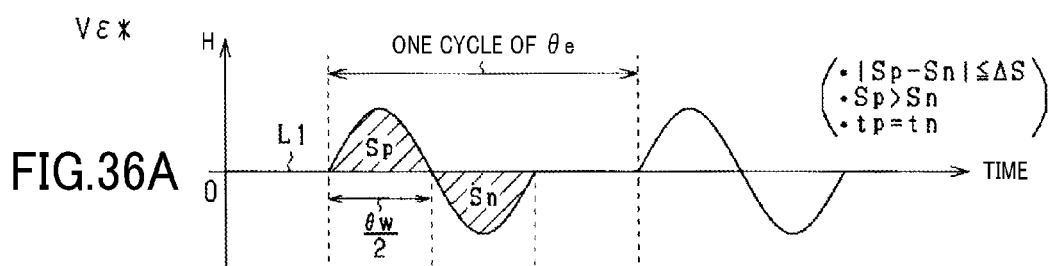
FIG. 36A
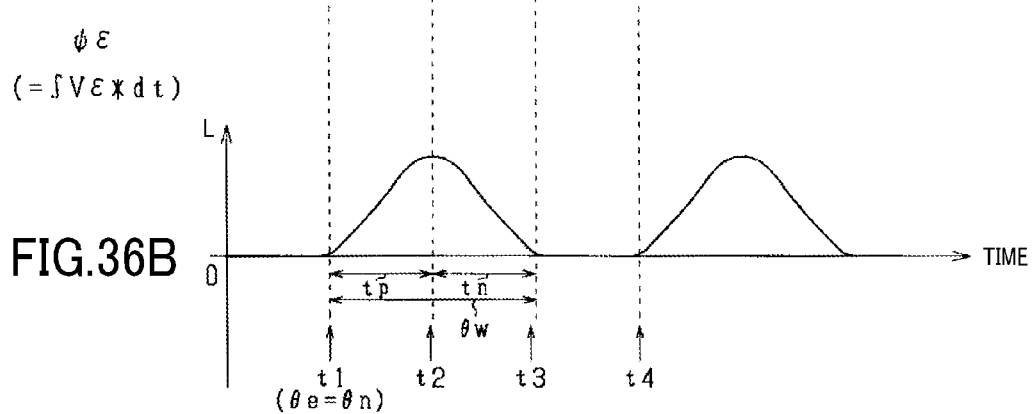
FIG. 36B

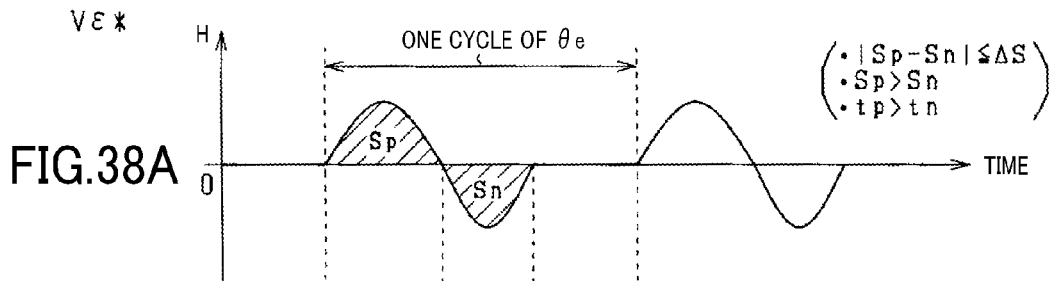
FIG.38A
FIG.38B
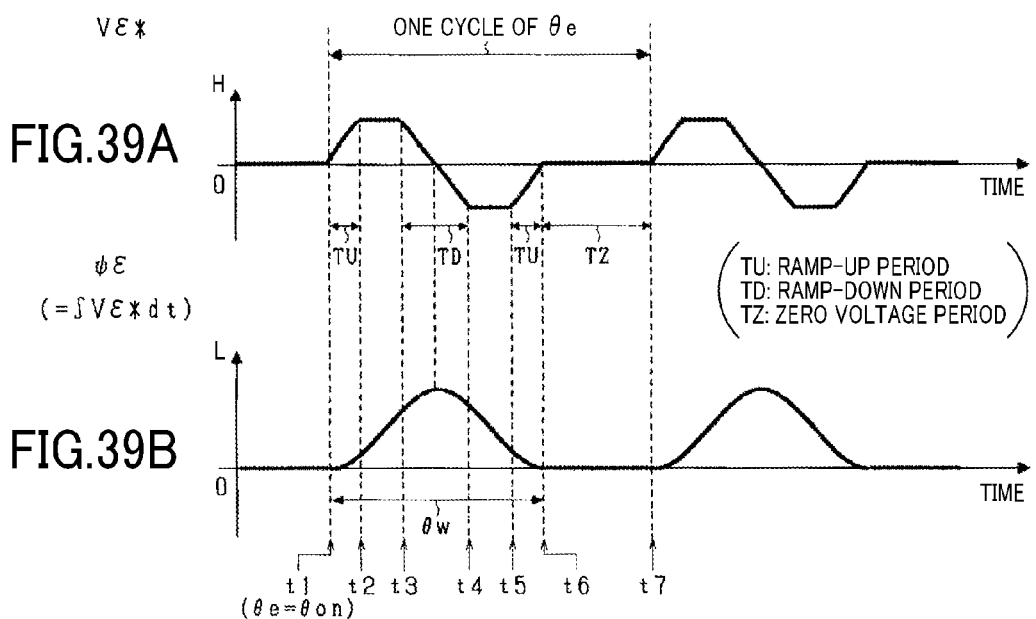
FIG.39A
FIG.39B

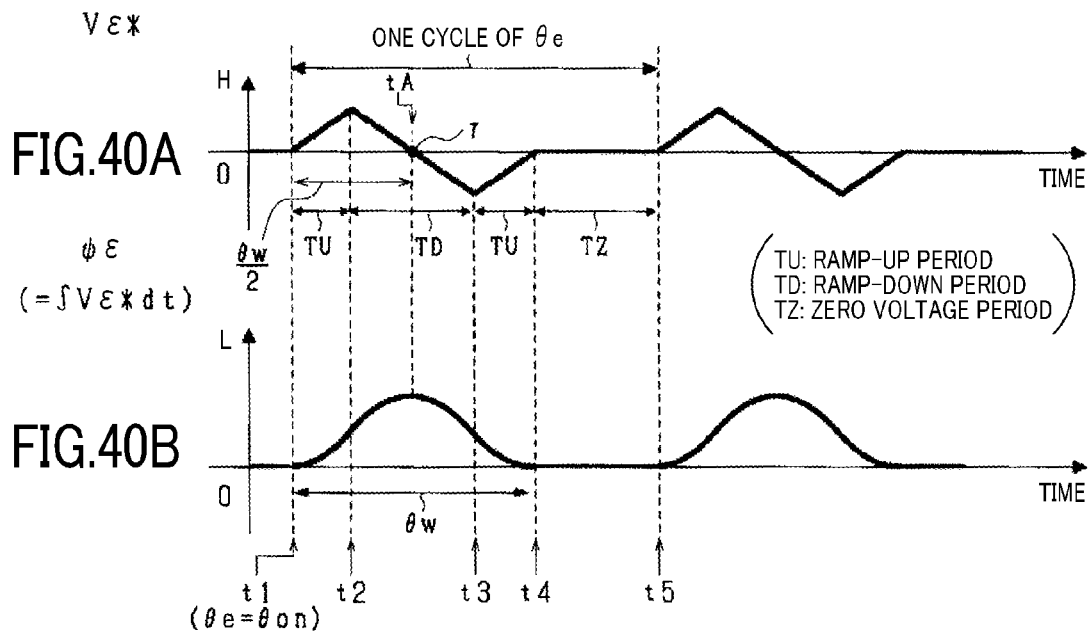
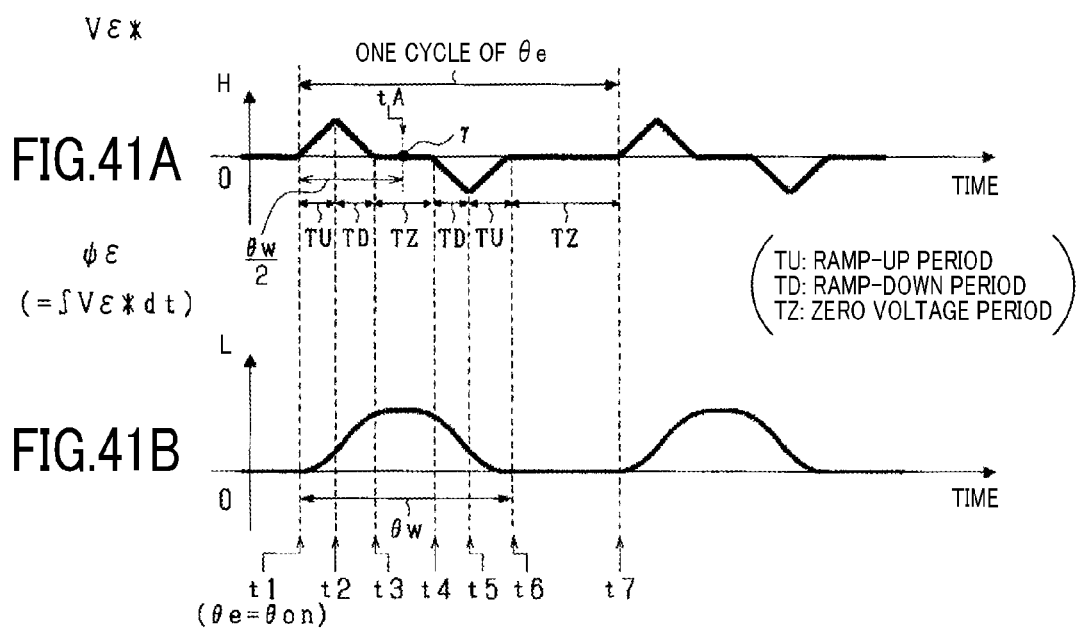

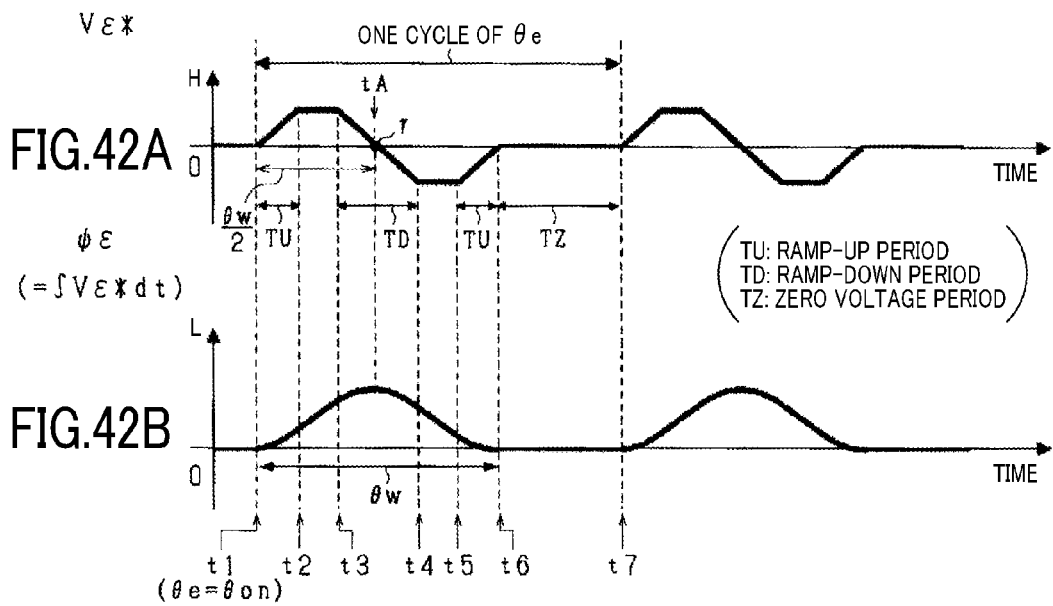
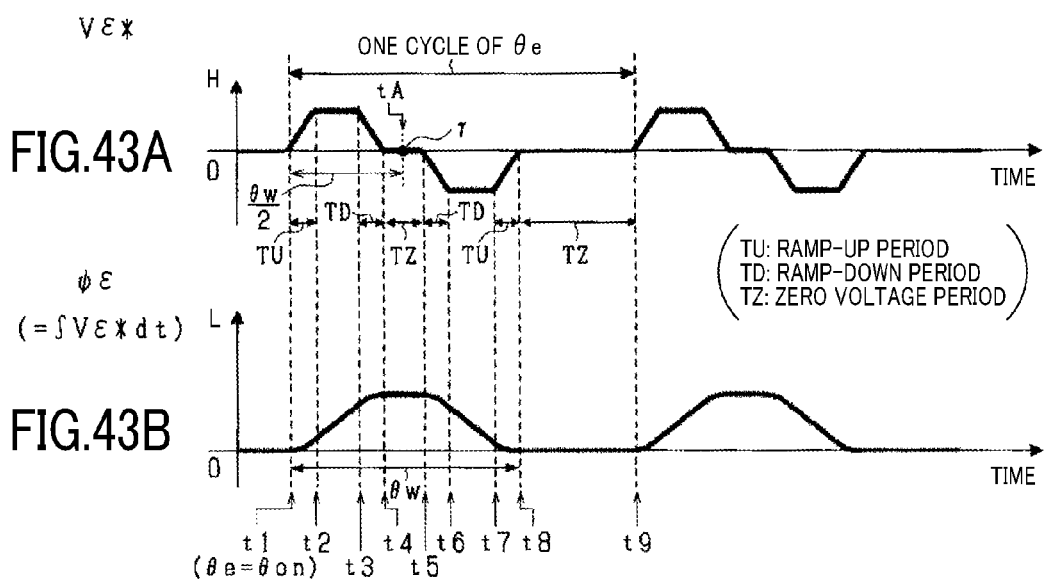

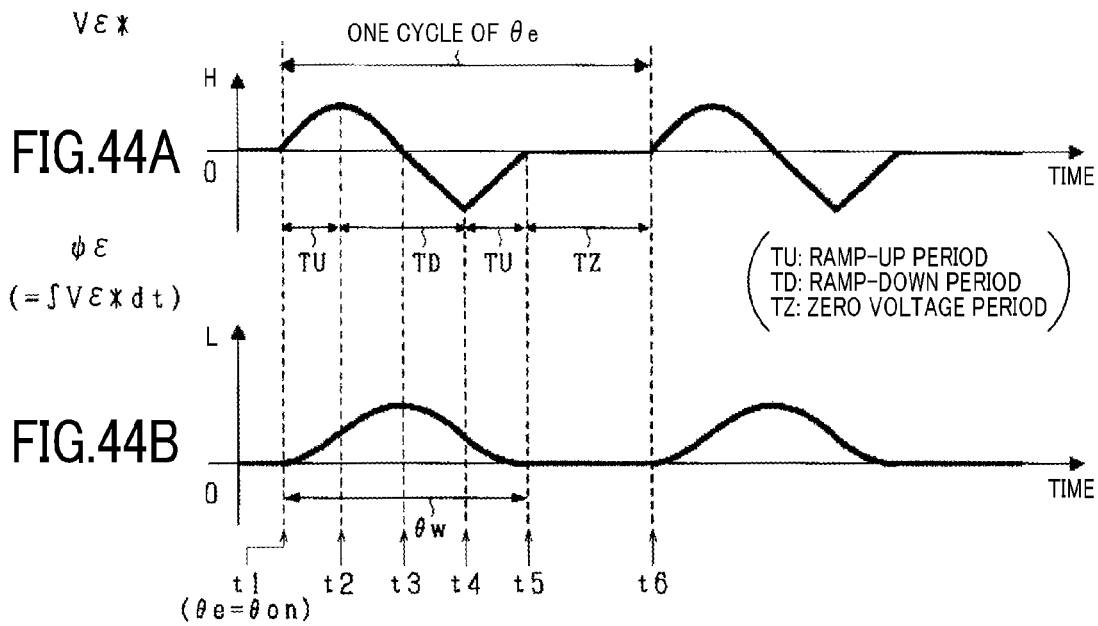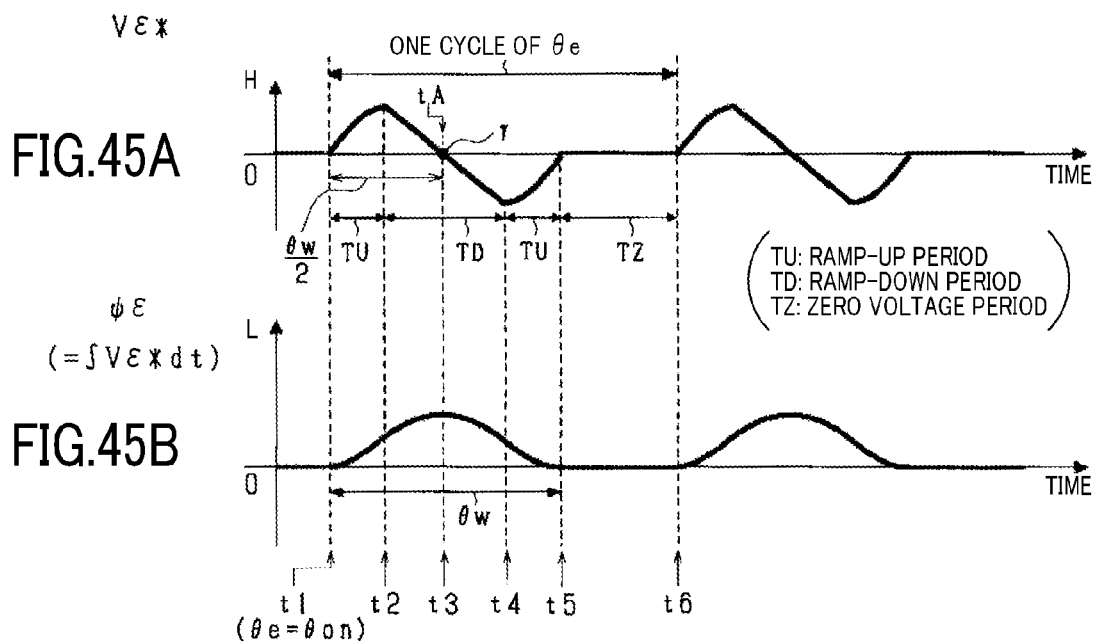

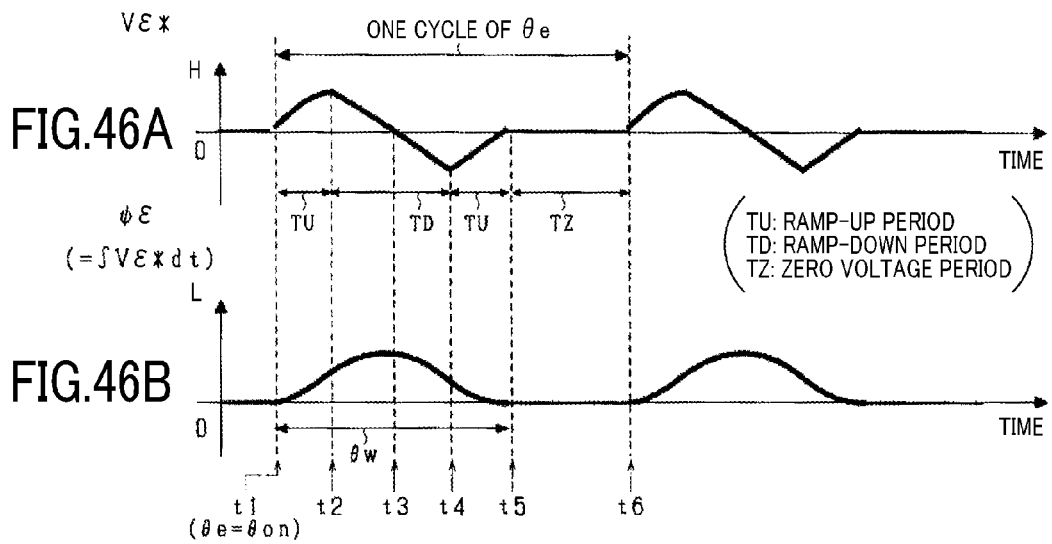
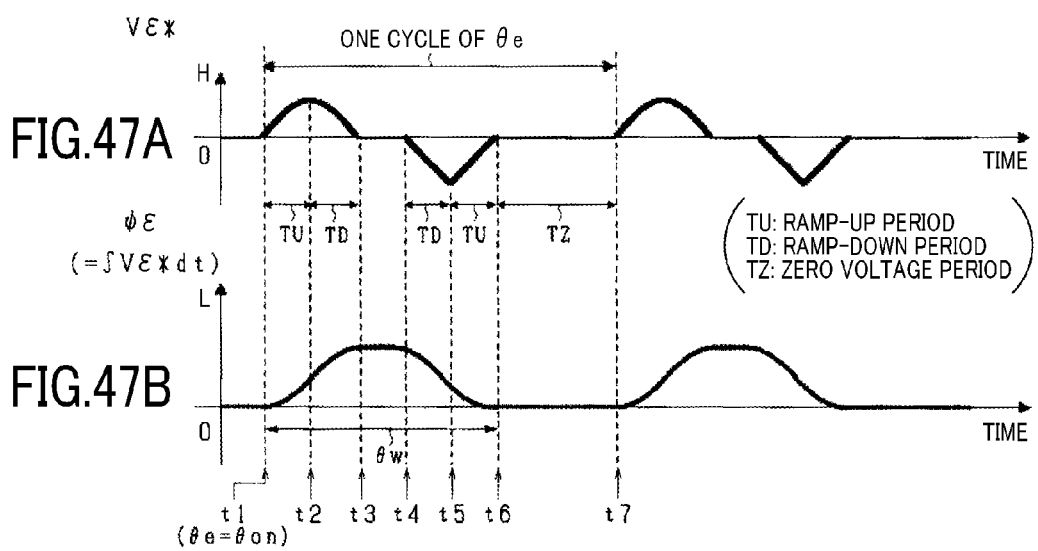

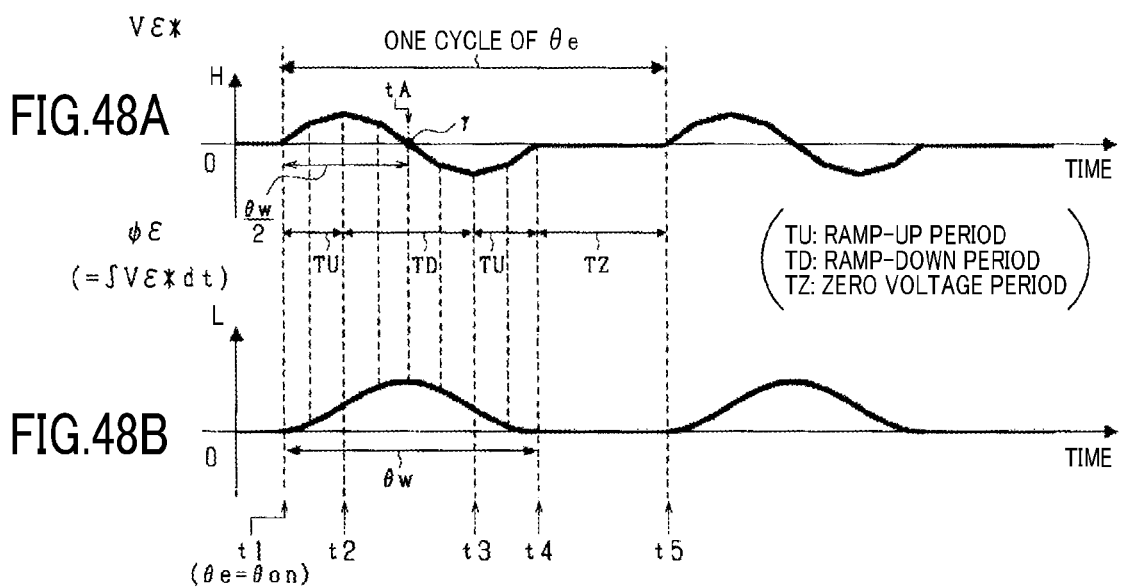

CONTROL APPARATUS FOR A SWITCHED RELUCTANCE MOTOR

CROSS-REFERENCE TO RELATED APPLICATION

This application is based on and claims the benefit of priority from earlier Japanese Patent Application No. 2013-39959 filed Feb. 28, 2013 and earlier Japanese Patent Application No. 2013-218851 filed Oct. 22, 2013, the description of which is incorporated herein by reference.

BACKGROUND (Technical Field)

The present invention relates to a control apparatus for a switched reluctance motor.

(Related Art)

A known control apparatus for a switched reluctance (SR) motor, as disclosed in Japanese Patent No. 3255167, controls a current flowing through a coil of the SR motor to a command current with use of a hysteresis comparator. More specifically, this apparatus uses a positive direct-current voltage (VDC), a zero voltage and a negative direct-current voltage (−VDC) to be applied to the coil of the SR motor. This is intended to reduce a switching frequency and the ripple in the current flowing through the coil and thereby reduce harmonic core losses and noise of the SR motor caused by switching of the inverter.

In the apparatus as disclosed in Japanese Patent No. 3255167, to control the current flowing through the coil of the SR motor to the command current, a voltage applied to the coil is switched from a zero voltage to a positive DC voltage, or from a zero voltage to a negative DC voltage. This will cause an interlinkage magnetic flux waveform of the coil to be distorted and to include many harmonic components. There may therefore be concern that the effect of the apparatus to reduce the harmonic core losses and noise of the SR motor is not exhibited sufficiently.

In consideration of the foregoing, it would therefore be desirable to have a control apparatus for an SR motor, capable of advantageously reducing harmonic core losses and noise in the SR motor.

SUMMARY

Accordance with an exemplary embodiment of the present invention, there is provided an apparatus for controlling a switched reluctance motor with use of a power conversion circuit. In the apparatus, a command voltage setter is configured to set a command voltage for a coil of the motor such that the command voltage changes gradually during either or both of a ramp-up period and a ramp-down period of the command voltage. A voltage controller is configured to control a voltage applied to the coil to the command voltage set by the command voltage setter by operating the power conversion circuit.

Moderate changes in the flux linkage of the coil can reduce harmonic core losses and noise of the SR motor. Indeed, according to the inventor's findings, moderate changes during either or both of the ramp-up and ramp-down periods of the applied voltage to the coil can lead to moderate changes in the flux linkage of the coil that is given by an integration value of the applied voltage to the coil. Hence in the embodiment, the command voltage is set by the command voltage setter to change gradually. The voltage applied to the coil is controlled to the command voltage by the voltage controller. The flux linkage is thereby controlled indirectly. This can lead to moderate changes in the flux linkage of the coil, and can reduce harmonic components of the flux linkage. Thus, harmonic core losses and noise of the SR motor can be reduced advantageously.

BRIEF DESCRIPTION OF THE DRAWINGS

In the accompanying drawings:

FIG. 12 shows the effects of the voltage control process in accordance with the first embodiment;

FIGS. 22A and 22B show a process of setting a command voltage in accordance with a seventh embodiment;

FIGS. 23A-23D show the effects of a voltage control process in accordance with the seventh embodiment;

FIGS. 24A and 24B show a process of setting a command voltage in accordance with an eighth embodiment;

FIGS. 25A-25D show the effects of a voltage control process in accordance with the eighth embodiment;

FIGS. 28A-28C show the effects of the voltage control process in accordance with the ninth embodiment;

FIGS. 29A and 29B show a process of setting a command voltage in accordance with a tenth embodiment;

FIGS. 30A and 30B show a process of setting a command voltage in accordance with an eleventh embodiment;

FIGS. 31A and 31B show a process of setting a command voltage in accordance with a twelfth embodiment;

FIGS. 32A and 32B show a process of setting a command voltage in accordance with a thirteenth embodiment;

FIG. 35 shows the effects of reducing core losses in accordance with the thirteenth embodiment;

FIGS. 36A and 36B show a process of setting a command voltage in accordance with a fourteenth embodiment;

FIGS. 38A and 38B show a process of setting a command voltage in accordance with a fifteenth embodiment;

FIGS. 39A and 39B show a process of setting a command voltage in accordance with one variation;

FIGS. 40A and 40B show a process of setting a command voltage in accordance with one variation;

FIGS. 41A and 41B show a process of setting a command voltage in accordance with one variation;

FIGS. 42A and 42B show a process of setting a command voltage in accordance with one variation;

FIGS. 43A and 43B show a process of setting a command voltage in accordance with one variation;

FIGS. 44A and 44B show a process of setting a command voltage in accordance with one variation;

FIGS. 45A and 45B show a process of setting a command voltage in accordance with one variation;

FIGS. 46A and 46B show a process of setting a command voltage in accordance with one variation;

FIGS. 47A and 47B show a process of setting a command voltage in accordance with one variation; and FIGS. 48A and 48B show a process of setting a command voltage in accordance with one variation.

DESCRIPTION OF SPECIFIC EMBODIMENTS

First Embodiment

A control apparatus for a switched reluctance (SR) motor as a vehicle prime mover in accordance with a first embodiment of the present invention will be described more fully hereinafter with reference to the accompanying drawings.

Figure 1:
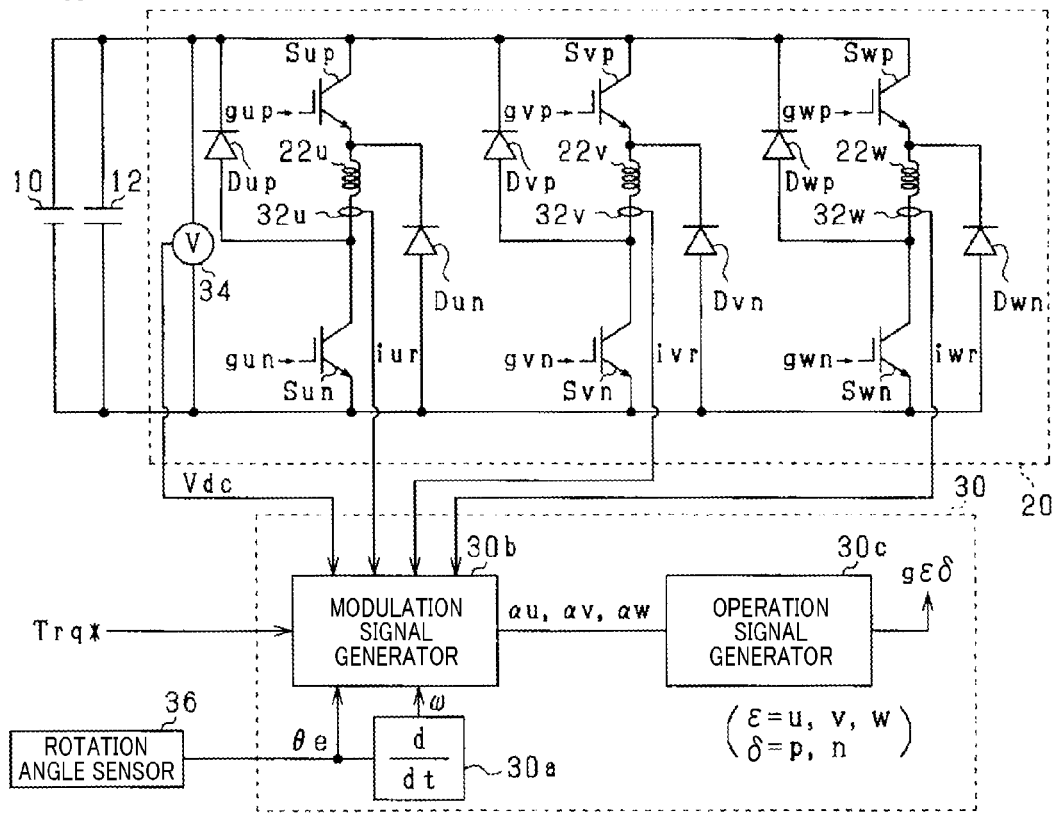
FIG. 1 shows a SR motor control system in accordance with a first embodiment.

As shown in FIG. 1, a high-voltage battery 10, as a DC power supply, is a secondary battery having a terminal voltage of 100V or more (e.g., 288V), such as a lithium-ion secondary battery, a nickel-metal-hydride secondary battery or the like.

The high-voltage battery 10 is electrically connected to a power conversion circuit 20 via a smoothing capacitor 12.

The power conversion circuit 20 is electrically connected to a vehicle-mounted motor generator as a vehicle prime mover. The motor generator is a SR motor. More specifically, in the present embodiment, a three-phase SR motor having a U-phase coil 22$u$, a V-phase coil 22$v$ and a W-phase coil 22$w$ is used as the SR motor. The power conversion circuit 20 includes a series connection of a U-phase upper-arm switching element Sup and a U-phase lower-arm diode (as a rectifying element) Dun, a series connection of a U-phase upper-arm diode (as a rectifying element) Dup and a U-phase lower-arm switching element Sun, a series connection of a V-phase upper-arm switching element Svp and a V-phase lower-arm diode (as a rectifying element) Dvn, a series connection of a V-phase upper-arm diode (as a rectifying element) Dvp and a V-phase lower-arm switching element Svn, a series connection of a W-phase upper-arm switching element Swp and a W-phase lower-arm diode (as a rectifying element) Dwn, and a series connection of a W-phase upper-arm diode (as a rectifying element) Dwp and a W-phase lower-arm switching element Swn. In the present embodiment, each of the U-phase upper-arm switching element Sup, the V-phase upper-arm switching element Svp, the W-phase upper-arm switching element Swp, the U-phase lower-arm switching element Sun, the V-phase lower-arm switching element Svn, and the W-phase lower-arm switching element Swn is an insulated gate bipolar transistor (IGBT).

More specifically, a junction between the U-phase upper-arm switching element Sup and the U-phase lower-arm diode Dun and a junction between the U-phase upper-arm diode Dup and the U-phase lower-arm switching element Sun are electrically connected to each other through a U-phase coil 22$u$. An emitter of the U-phase upper-arm switching element Sup and a cathode of the U-phase lower-arm diode Dun are electrically connected to each other. A collector of the U-phase upper-arm switching element Sup is electrically connected to a positive terminal of the high-voltage battery 10. An anode of the U-phase lower-arm diode Dun is electrically connected to a negative terminal of the high-voltage battery 10. An anode of the U-phase upper-arm diode Dup and a collector of the U-phase lower-arm switching element Sun are electrically connected to each other. A cathode of the U-phase upper-arm diode Dup is electrically connected to the positive terminal of the high-voltage battery 10. An emitter of the U-phase lower-arm switching element Sun is electrically connected to the negative terminal of the high-voltage battery 10.

Similarly, a junction between the V-phase upper-arm switching element Svp and the V-phase lower-arm diode Dvn and a junction between the V-phase upper-arm diode Dvp and the V-phase lower-arm switching element Svn are electrically connected to each other through a V-phase coil 22$v$. An emitter of the V-phase upper-arm switching element Svp and a cathode of the V-phase lower-arm diode Dvn are electrically connected to each other. A collector of the V-phase upper-arm switching element Svp is electrically connected to the positive terminal of the high-voltage battery 10. An anode of the V-phase lower-arm diode Dvn is electrically connected to the negative terminal of the high-voltage battery 10. An anode of the V-phase upper-arm diode Dvp and a collector of the V-phase lower-arm switching element Svn are electrically connected to each other. A cathode of the V-phase upper-arm diode Dvp is electrically connected to the positive terminal of the high-voltage battery 10. An emitter of the V-phase lower-arm switching element Svn is electrically connected to the negative terminal of the high-voltage battery 10.

A junction between the W-phase upper-arm switching element Swp and the W-phase lower-arm diode Dwn and a junction between the W-phase upper-arm diode Dwp and the W-phase lower-arm switching element Swn are electrically connected to each other through a W-phase coil 22w. An emitter of the W-phase upper-arm switching element Swp and a cathode of the W-phase lower-arm diode Dwn are electrically connected to each other. A collector of the W-phase upper-arm switching element Swp is electrically connected to the positive terminal of the high-voltage battery 10. An anode of the W-phase lower-arm diode Dwn is electrically connected to the negative terminal of the high-voltage battery 10. An anode of the W-phase upper-arm diode Dwp and a collector of the W-phase lower-arm switching element Swn are electrically connected to each other. A cathode of the W-phase upper-arm diode Dwp is electrically connected to the positive terminal of the high-voltage battery 10. An emitter of the W-phase lower-arm switching element Swn is electrically connected to the negative terminal of the high-voltage battery 10.

The control apparatus 30 includes a central processing unit (CPU) and a memory (both not shown) to control a controlled variable, i.e., an output torque, of the SR motor to its command value (hereinafter referred to as a command torque $Trq^*$) through various programs stored in the memory being executed in the CPU. The control apparatus 30 receives detection values from a U-phase current sensor 32u adapted to detect a current flowing through the U-phase coil 22u, a V-phase current sensor 32v adapted to detect a current flowing through the V-phase coil 22v, and a W-phase current sensor 32w adapted to detect a current flowing through the W-phase coil 22w. The control apparatus 30 receives detection values from a voltage sensor 34 adapted to detect an inter-terminal voltage of a smoothing capacitor 12 (i.e., an output voltage of the high-voltage battery 10, an input voltage of the power conversion circuit 20) and a rotation angle sensor 36, such as a resolver, adapted to detect a rotation angle (i.e., an electric angle $\theta e$) of a rotor of the SR motor. To control the output torque of the SR motor to the command torque $Trq^*$ on the basis of the detection values from such sensors, the control apparatus 30 feeds operation signals $g\epsilon p$, $g\epsilon n$ ($\epsilon$=u, v, w) to the upper-arm switching element $S\epsilon p$ ($\epsilon$=u, v, w) and the lower-arm switching element $S\epsilon n$ of the power conversion circuit 20, respectively, to operate the respective switching elements $S\epsilon p$, $S\epsilon n$.

More specifically the control apparatus 30 includes an electrical angular speed calculator 30a, a modulation signal generator 30b and an operation signal generator 30c. The electrical angular speed calculator 30a calculates an electrical angular speed $\omega$ as a time derivative of an electric angle $\theta e$ detected by a rotation angle sensor 36. The modulation signal generator 30b (as a command voltage setter) generates modulation (or modulating) signals $\alpha\epsilon$ ($\epsilon$=u, v, w) on the basis of the command torque $Trq^*$, the electric angle $\theta e$ and the electrical angular speed $\omega$. The operation signal generator 30c generates the operation signals $g\epsilon p$, $g\epsilon n$ on the basis of the modulation signals $\alpha\epsilon$ ($\epsilon$=u, v, w) received form the modulation signal generator 30b to operate the upper-arm switching elements $S\epsilon p$ ($\epsilon$=u, v, w) and the lower-arm switching elements $S\epsilon n$ ($\epsilon$=u, v, w). The modulation signals for the U-, V-, and W-phases are 120 degrees out of phase.

The command torque $Trq^*$ may be fed from an upper-level controller that is different from the controller 30 and collectively controls traveling of the subject vehicle. The U-, V- and W-phase currents of the SR motor are independent of each other and controlled in a similar manner.

Figure 2A:
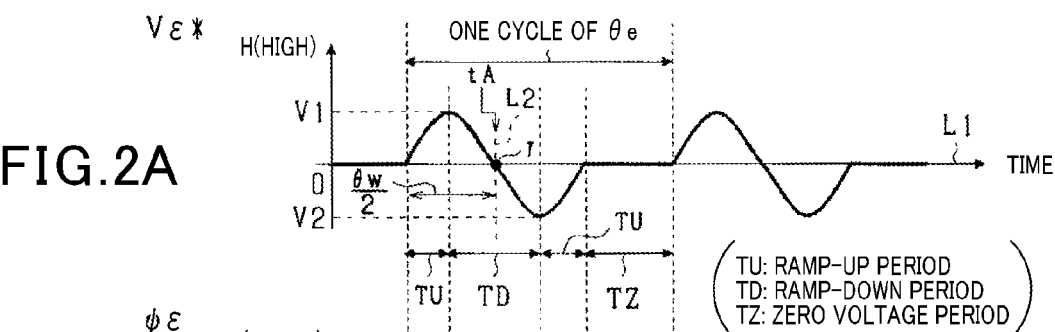
FIGS. 2A and 2B show a process of setting a command voltage in accordance with the first embodiment.
Figure 2B:
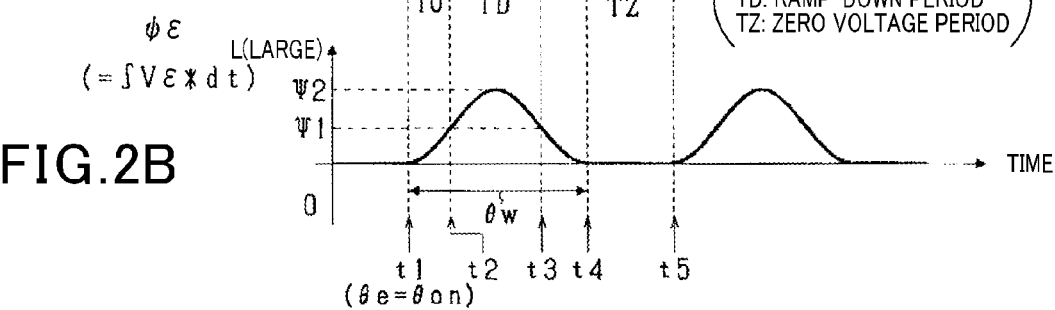

Subsequently, a process of setting U-, V- and W-phase command voltages in accordance with the present embodiment will now be explained with reference to FIGS. 2A and 2B. FIG. 2A shows the course of a command value of the voltage applied to the coil 22$\epsilon$ ($\epsilon$=u, v, w) (hereinafter referred to as a command voltage $V\epsilon^*$). FIG. 2B shows the course of a flux linkage $\psi\epsilon$ for the coil 22$\epsilon$. In FIGS. 2A and 2B, it is assumed that the electrical angular speed $\omega$ is kept constant.

As shown in FIGS. 2A and 2B, in the present embodiment, the command voltage $V\epsilon^*$ is set to change gradually during ramp-up periods (a period of time t1 through t2 and a period of time t3 through t4) and a ramp-down period (a period of time t2 through t3). The command voltage $V\epsilon^*$ is further set to change continuously within one cycle of the electric angle $\theta e$ (for example, a period of time t1 through time t5). The ramp-up period is a time period in which the command voltage $V\epsilon^*$ is ramped up (or a change rate of the command voltage $V\epsilon^*$ is greater than zero). The ramp-down period is a time period in which the command voltage $V\epsilon^*$ is ramped down (or a change rate of the command voltage $V\epsilon^*$ is less than zero).

In the present embodiment, the command voltage $VE\epsilon^*$ is set such that, during an energization period (in which the coil is energized) included within one cycle of the electric angle $\theta e$ (for example, of time t1 through t5), a first sinusoidal waveform of the command voltage $V\epsilon^*$ (as a first waveform of the command voltage $V\epsilon^*$ during a period of time t1 through tA within the energization period of time t1 through t4) is directly followed by a second sinusoidal waveform of the command voltage $V\epsilon^*$ (as a second waveform of the command voltage $V\epsilon^*$ during a period of time tA through t4 within the energization period) and the first and second sinusoidal waveforms of the command voltage $V\epsilon^*$ are symmetrical about an intersection point $\gamma$ of a first axis line L1 (defining V=0) and a second axis line L2 perpendicular to the first axis line L1 and passing through a center or midpoint of the energization period (at time tA=(t4−t1)/2). An area of a region enclosed by the first sinusoidal waveform of the command voltage $V\epsilon^*$ and the first axis line L1 is equal to an area of a region enclosed by the second sinusoidal waveform of the command voltage $V\epsilon^*$ and the first axis line L1.

The above settings of the command voltage $V\epsilon^*$ are intended to reduce harmonic core losses, vibration and noise of the SR motor. That is, the settings of the command voltage $V\epsilon^*$ causing moderate changes in the flux linkage $\psi\epsilon$ can reduce harmonic core losses, vibration and noise of the SR motor. The flux linkage $\psi\epsilon$ is given by a time integration value of the applied voltage to the coil 22$\epsilon$. Therefore, setting the command voltage $V\epsilon^*$ to change gradually as above can lead to moderate changes in the flux linkage $\psi\epsilon$ during the ramp-up and ramp-down periods.

More specifically, as the command voltage $V\epsilon^*$ is increased gradually from zero to a first voltage V1 that is an upper limit (as a first or third predetermined voltage) during a period of time t1 through t2 (as a first time period), the applied voltage $V\epsilon r$ to the coil 22$\epsilon$ increases gradually from zero to the upper limit. Accordingly, the flux linkage $\psi\epsilon$ that is a time integral of the applied voltage $V\epsilon r$ increases gradually from zero, a value of the flux linkage $\psi\epsilon$ when the command voltage $V\epsilon^*$ is zero, to a first amount of magnetic flux $\psi 1$ that is a positive value (as a first or third value). In the present embodiment, a process of setting the command voltage $V\epsilon^*$ during the period of time t1 through t2 corresponds to a first process.

Subsequently, as the command voltage V$\epsilon$* is decreased gradually from the first voltage V1 to zero during a period of time t2 through tA (as a third time period), the applied voltage V$\epsilon$r to the coil 22$\epsilon$ decreases gradually from the first voltage V1 to zero. Accordingly, the flux linkage $\psi\epsilon$ increases gradually to a second amount of magnetic flux $\psi$2 (as a fourth predetermined vale) while decreasing an increasing rate of the flux linkage $\psi\epsilon$. In the present embodiment, a process of setting the command voltage V$\epsilon$* during the period of time t2 through tA corresponds to a third process.

Thereafter, as the command voltage V$\epsilon$* is decreased gradually from zero to a second voltage V2 (as a second or fourth voltage) during a period of time tA through t3 (as a fourth time period), the applied voltage V$\epsilon$r to the coil 22$\epsilon$ decreases gradually from zero to the second voltage V2. The second voltage V2 is a negative and lower limit value of the command voltage V$\epsilon$*. In the present embodiment, the absolute value of the second voltage V2 is set equal to the absolute value of the first voltage V1. Accordingly, the flux linkage $\psi\epsilon$ decreases gradually from the second amount of magnetic flux $\psi$2 to the first amount of magnetic flux $\psi$1. In the present embodiment, a process of setting the command voltage V$\epsilon$* during the period of time tA through t3 corresponds to a fourth process.

Subsequently, as the command voltage V$\epsilon$* is increased gradually from the second voltage V2 to zero during a period of time t3 through t4 (as the second time period), the applied voltage V$\epsilon$r to the coil 22$\epsilon$ increases gradually from the second voltage V2 to zero. Accordingly, the flux linkage $\psi\epsilon$ decreases gradually from the first amount of magnetic flux $\psi$1 to zero while decreasing a decreasing rate of the flux linkage $\psi\epsilon$. In the present embodiment, a process of setting the command voltage V$\epsilon$* during the period of time t3 through t4 corresponds to a second process.

Setting the command voltage V$\epsilon$* to have a sinusoidal waveform (i.e. of an ideal sinusoidal wave) leads to a flux linkage $\psi\epsilon$ having a sinusoidal waveform within one cycle of the electric angle $\theta$e, as shown in FIG. 2B. This can enhance the effect of reducing harmonic core losses and the like.

Figure 3A:
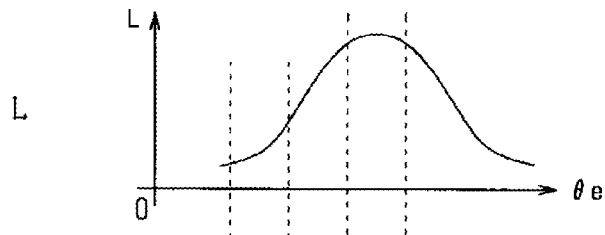
FIGS. 3A-3C show the courses of the inductance, an applied voltage, and a current flowing through a coil in accordance with the first embodiment.

The current flowing through the coil 22$\epsilon$ changes from zero to its upper limit and then from the upper limit to zero only once within one cycle of the electric angle $\theta$e, where the current changes in response to changes in the command voltage V$\epsilon$*. FIG. 3A shows the course of the inductance L of the coil 22$\epsilon$, FIG. 3B shows the course of the command voltage V$\epsilon$*, and FIG. 3C shows the course of the current i$\epsilon$ flowing through the coil 22$\epsilon$.

Figure 3B:
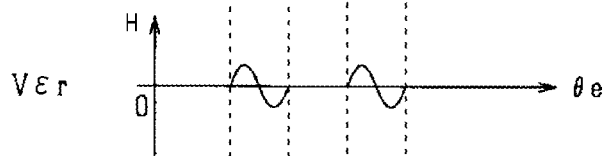
Figure 3C:
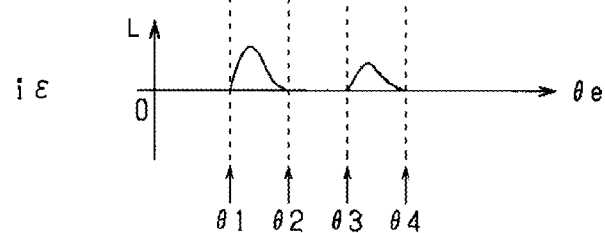

As shown in FIGS. 3A-3C, the variation of the command voltage V* within one cycle of the command voltage V* may differ from the variation of the current i$\epsilon$ flowing through the coil 22$\epsilon$ within one cycle of the current i$\epsilon$. This is due to a variation of the inductance L or the electrical angular speed $\omega$ with the electric angle $\theta$e. FIG. 3 shows an example where the current i$\epsilon$ within one cycle of the electric angle $\theta$1 through $\theta$2 is greater than the current i$\epsilon$ within one cycle of the electric angle $\theta$3 through $\theta$4, which is caused by a difference in the inductance L between in the cycle of the electric angle $\theta$1 through $\theta$2 and in the cycle of the electric angle $\theta$3 through $\theta$4. In the example of FIGS. 3A-3C, the inductance L over the electric angles $\theta$1 through $\theta$2 is less than the inductance L over the electric angles $\theta$3 through $\theta$4.

The technique that gradually changes the applied voltage to the coil 22$\epsilon$ to provide moderate changes in the flux linkage $\psi\epsilon$ is different from the technique disclosed in Japanese Patent No. 3255167 (hereinafter the prior art).

Figure 4A:
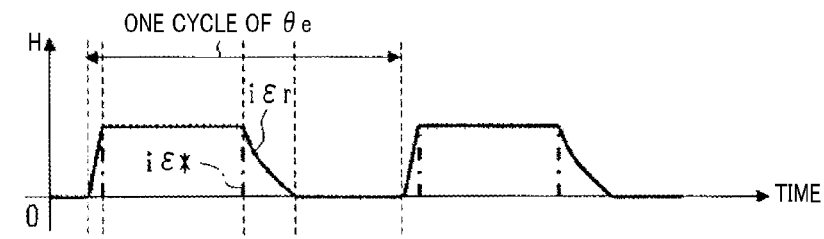
FIGS. 4A-4C show a process of controlling a command current in accordance with the prior art.
Figure 4B:
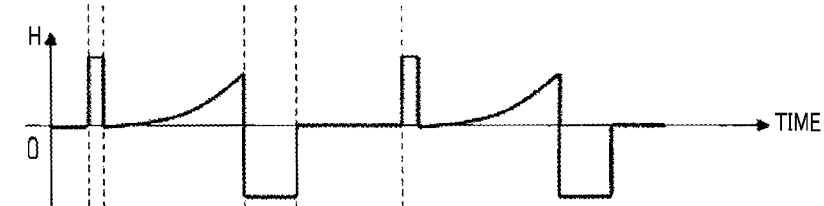
Figure 4C:
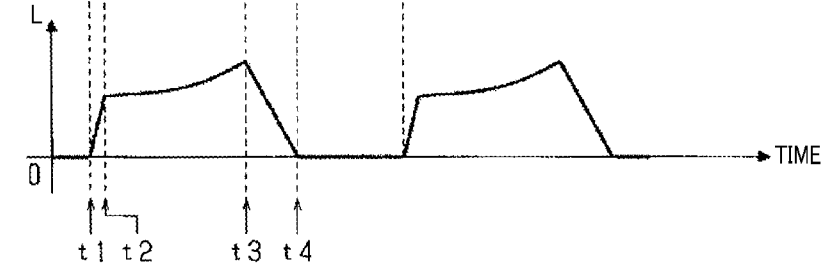

FIGS. 4A-4C show the courses of the flux linkage $\psi\epsilon$ and others in accordance with the prior art. More specifically, FIG. 4A shows the courses of the command current flowing through the coil 22$\epsilon$ (command current i$\epsilon$*) and the current detected by the $\epsilon$-phase current sensor 32$\epsilon$ (hereinafter a detected current i$\epsilon$r). FIG. 4B shows the course of the applied voltage V$\epsilon$r to the coil 22$\epsilon$. FIG. 4C shows the course of the flux linkage $\psi\epsilon$ of the coil 22$\epsilon$.

As shown in FIG. 4A-4C, in the prior art, the command current i$\epsilon$* is set to be a square-wave current to control the detected current i$\epsilon$r to the command current i$\epsilon$* to reduce the torque ripple of the SR motor. In the prior art, as show in FIG. 4B, the applied voltage V$\epsilon$r to the coil 22$\epsilon$ changes in response to changes in the detected current i$\epsilon$r. Accordingly, the applied voltage V$\epsilon$r changes rapidly during a period of time t1 through t2 in which the upper-arm switching element S$\epsilon$p and the lower-arm switching element S$\epsilon$n are both turned on and during a period of time t3 through t4 in which the upper-arm switching element S$\epsilon$p and the lower-arm switching element S$\epsilon$n are both turned off. As shown in FIG. 4C, the flux linkage $\psi\epsilon$ of the coil 22$\epsilon$ thereby changes rapidly during the same time periods.

More specifically, during the period of time t1 through t2, the applied voltage V$\epsilon$r increases rapidly so as to control the detected current i$\epsilon$r to the command current i$\epsilon$* according to the settings of the command current i$\epsilon$*. Thereafter, the applied voltage V$\epsilon$r decreases rapidly to zero. Accordingly, the detected current i$\epsilon$r increases to a predetermined current value in a short time. Since the flux linkage $\psi$ is given by a time integral of the applied voltage V$\epsilon$r, the flux linkage $\psi$ increases to a predetermined flux linkage in a short time.

Subsequently, during a period of time t2 through t3, since the detected current i$\epsilon$r is substantially equal to the command current i$\epsilon$*, the applied voltage V$\epsilon$r changes so that the detected current i$\epsilon$r is kept constant, where the applied voltage V$\epsilon$r will increase gradually from zero to the predetermined voltage. As the applied voltage V$\epsilon$r increases, the flux linkage $\psi\epsilon$ also increases gradually. During the period of time t3 through t4, the command current i$\epsilon$* is set to zero. Accordingly, to control the detected current i$\epsilon$r to the command current i£*, the applied voltage V$\epsilon$r decreases rapidly to a negative predetermined voltage. Thereafter, the applied voltage V$\epsilon$r increases rapidly to zero. The detected current i$\epsilon$r thereby decreases to zero in a short time. The flux linkage $\psi\epsilon$ takes an upper limit when the applied voltage V$\epsilon$r becomes zero and decreases to zero in a short time.

There is still concern that the changes in the flux linkage $\psi\epsilon$ may prevent harmonic core losses, vibration and noise of the SR motor from being reduced significantly.

To overcome such a problem, in the present embodiment, the command voltage V$\epsilon$* is set to change gradually while no command current i$\epsilon$* is set. In the present embodiment, each of the upper-arm switching elements S$\epsilon$p and the lower-arm switching elements S$\epsilon$n is tuned on or off by means of the pulse-width modulation. To this end, a modulation signal $\alpha\epsilon$ that is the command voltage V$\epsilon$* divided by the DC voltage outputted from the high-voltage battery 10 is used as the command voltage V$\epsilon$*.

Figure 5:
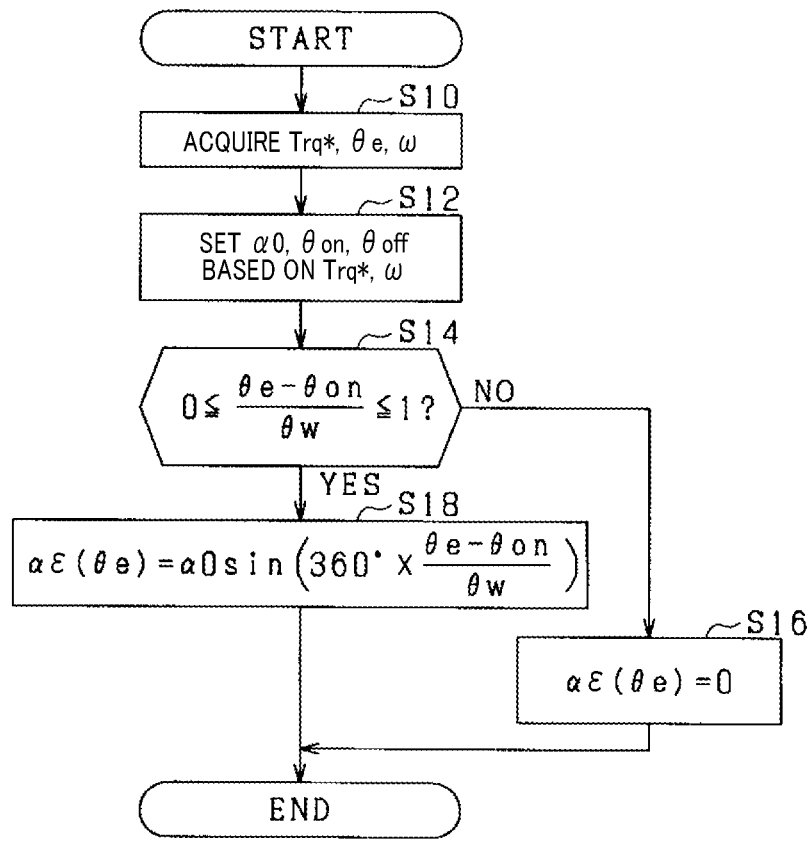
FIG. 5 shows a flowchart of a modulation signal generation process in accordance with the first embodiment.

FIG. 5 shows a flowchart of a modulation signal generation process in accordance with the present embodiment. This process may be performed in the modulation signal generator 30b (as a command voltage setter) every predetermined time interval.

First, in step S10, a command torque Trq*, an electrical angle $\theta$e and an electrical angular speed $\omega$ are acquired. Subsequently, in step S12, a command modulation rate $\alpha$0, an ON-phase $\theta$on (at time t1 in FIGS. 2A, 2B) that is an electrical angle θe indicative of initiation of energization of the U-phase coil 22u, and an energization angular width θw that is an angular width of electrical angle θe indicative of a duration (of time t1 through t4 in FIGS. 2A, 2B) in which the U-phase coil 22u is energized are set on the basis of the command torque Trq*, the electrical angle ee and the electrical angular speed ω acquired in step S10, where the command modulation rate α0 is the command voltage Vε* (set to have a sinusoidal waveform) divided by the DC voltage Vdc outputted from the high-voltage battery 10. The energization period set forth above is an elapsed time corresponding to the energization angular width θw from when the electrical angle ee becomes the ON-phase αon.

The command modulation rate α0, the ON-phase eon and the energization angular width θw may be set by means of maps or equations that define the command modulation rate α0, the ON-phase θon and the energization angular width θw associated with the command torque Trq* and the electrical angular speed ω.

In step S14, it is determined whether or not the current electrical angle θe is in the energization angular width θw corresponding to the energization period. More specifically, given a determination parameter that is (θe−θon)/θw, it is determined whether or not the determination parameter is equal to greater than 0 and equal to or less than 1.

If it is determined in step S14 that the determination parameter is less than zero or greater than one, then it is determined that the electrical angle θe is not in in the energization angular width θw and then the process proceeds to step S16, where the modulation signal αε is set to 0. If it is determined in step S14 that the determination parameter is equal to or greater than zero and equal to or less than one, then it is determined that the electrical angle ee is in the energization angular width ew and then the process proceeds to step S18, where the modulation signal αεis set to the command modulation rate α0 multiplied by a sinusoidal function of a multiplication of the determination parameter and 360 degrees.

After the operation in step S16 or step S18 is performed, the process is ended.

In the present embodiment, the command voltage Vε* shown in FIG. 2A is defined by a multiplication of the modulation signal αε calculated as above in the process shown in FIG. 5 and the DC voltage of the high-voltage battery 10.

Figure 6:
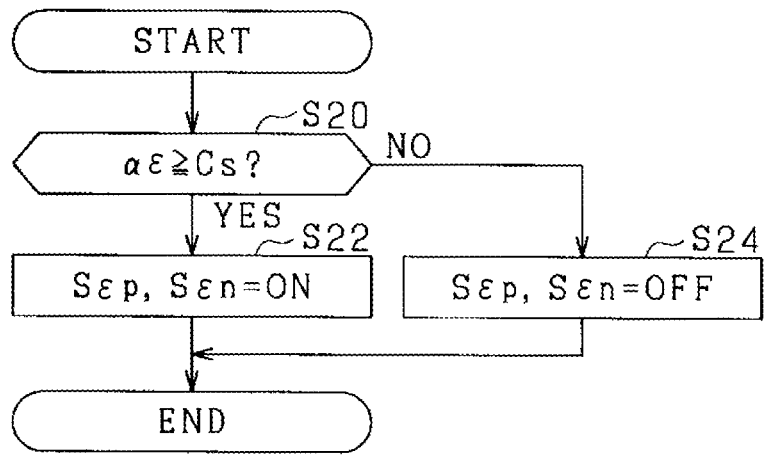
FIG. 6 shows a flowchart of a voltage control process in accordance with the first embodiment.

FIG. 6 shows a flowchart of a voltage control process in accordance with the present embodiment. This process may be performed in the operation signal generator 30c (as a voltage controller) of the controller 30 every predetermined time interval.

First, in step S20, it is determined whether or not the modulation signal αε outputted from the modulation signal generator 30b is equal to or greater than the carrier signal Cs. In the present embodiment, a triangular waveform signal is used as the carrier signal Cs. A maximum value of the carrier signal Cs is set to 1 and a minimum value of the carrier signal Cs is set to −1.

Figure 7:
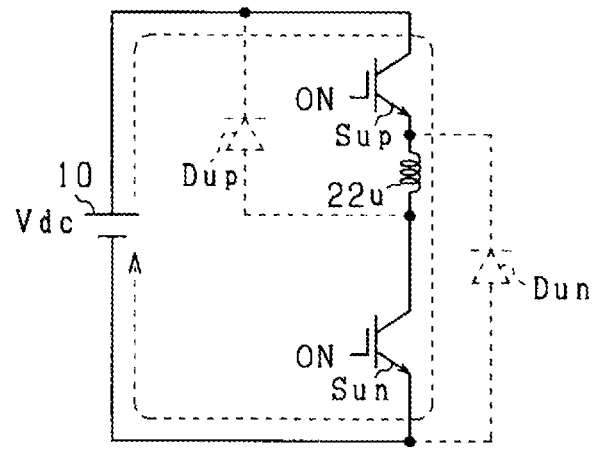
FIG. 7 shows a closed circuit formed when a positive voltage is applied to a coil in accordance with the first embodiment.

If it is determined in step S20 that the modulation signal αε outputted from the modulation signal generator 30b is equal to or greater than the carrier signal Cs, then the process proceeds to step S22, where the upper-arm switching element Sεp and the lower-arm switching element Sεn are both turned on. Accordingly, as shown in FIG. 7 for the U-phase, a current flows through a closed circuit including the high-voltage battery 10, the U-phase upper-arm switching element Sup, the U-phase coil 22u, the U-phase lower-arm switching element Sun in this order, and a positive voltage Vdc is applied to the U-phase coil 22u.

Figure 8:
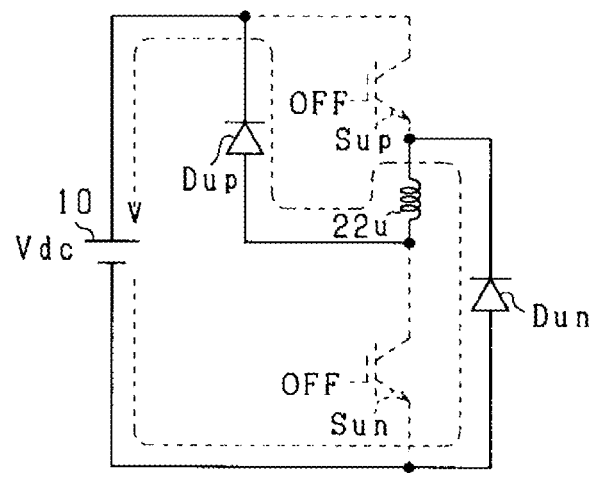
FIG. 8 shows a closed circuit formed when a negative voltage is applied to a coil in accordance with the first embodiment.

If it is determined in step S20 that the modulation signal αε outputted from the modulation signal generator 30b is less than the carrier signal Cs, then the process proceeds to step S24, where the upper-arm switching element Sεp and the lower-arm switching element Sεn are both turned off. Accordingly, as shown in FIG. 8 for the U-phase, a current flows through a closed circuit including the high-voltage battery 10, the U-phase lower-arm diode Dun, the U-phase coil 22u, the u-phase upper-arm diode Dup in this order, and a negative voltage −Vdc is applied to the U-phase coil 22u.

After the operation in step S22 or step S24 is performed, the process is ended.

Figure 9A:
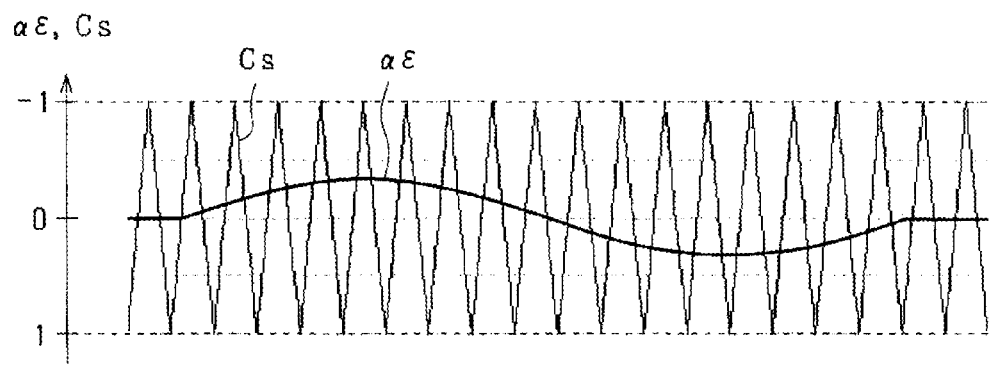
FIGS. 9A and 9B show timing charts of an example of pulse-width modulation in accordance with the first embodiment.
Figure 9B:
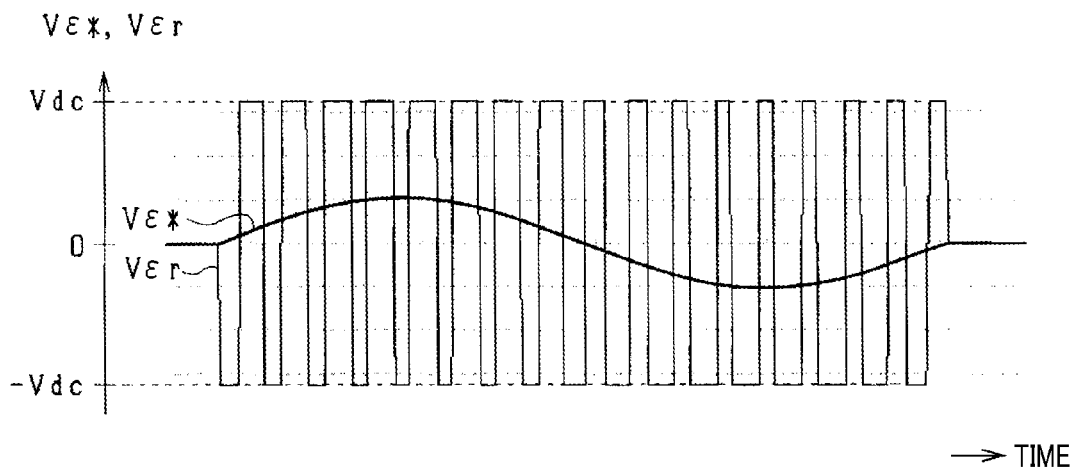

The above process of operating the upper-arm switching element Sεp and the lower-arm switching element Sεn allows the upper-arm switching element Sεp and the lower-arm switching element Sεn to be turned on or off with the pulse-width modulation based on the determination of whether or not the modulation signal αε is equal to or greater than the carrier signal Cs as shown in FIG. 9. This allows the average applied voltage of the coil 22ε for each cycle of the carrier signal Cs to be controlled to the command voltage Vε*. FIG. 9A shows the course of the modulation signal αε and the carrier signal Cs, and FIG. 9B shows the course of the applied voltage Vεr and the command voltage Vε* to the coil 22ε.

The effect of the voltage control process will now be explained with reference to FIGS. 10-12.

Figure 10:
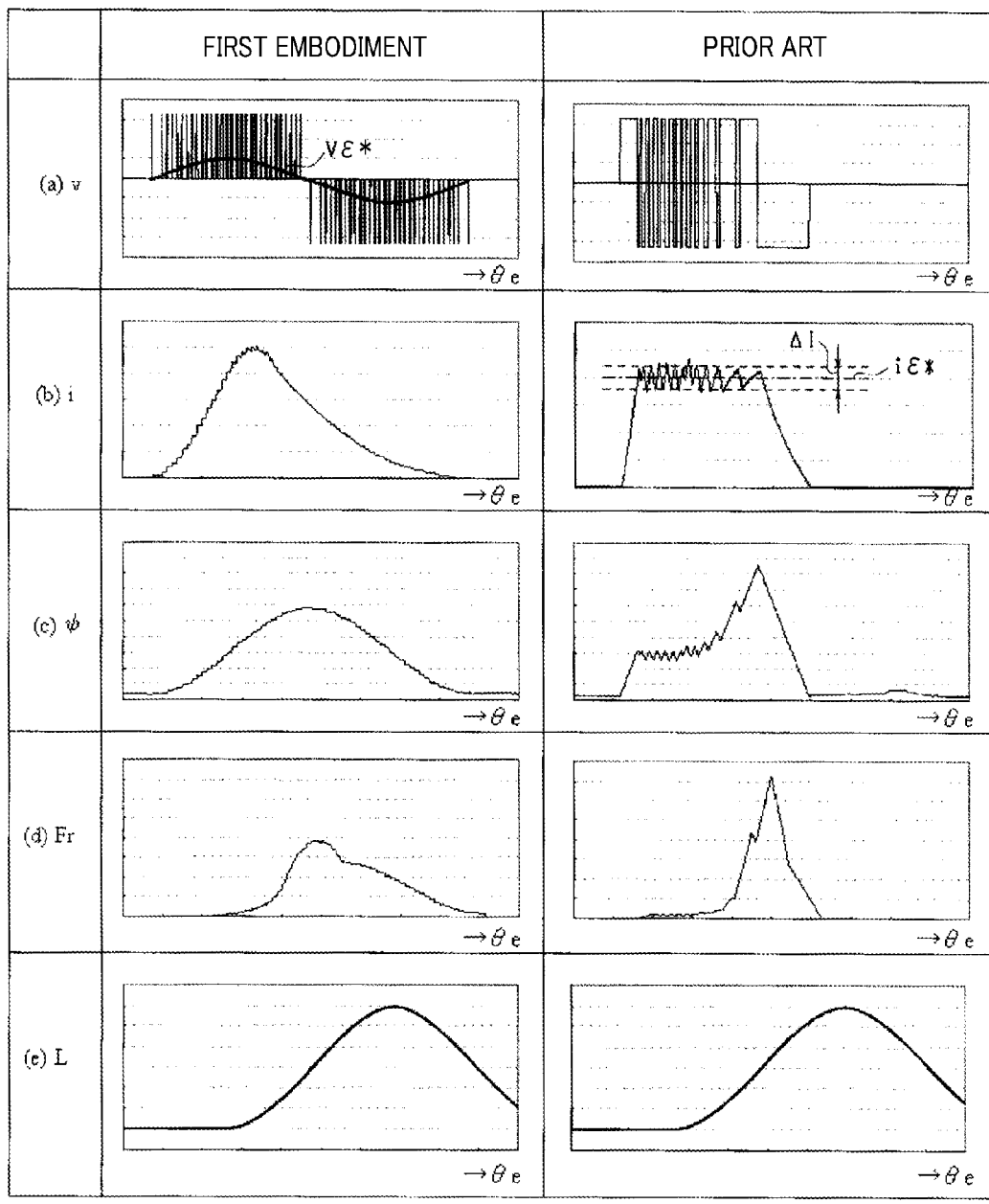
FIG. 10 shows the effects of a voltage control process in accordance with the first embodiment.

FIG. 10 shows, for each of the present invention and the prior art, (a) the applied voltage to the coil 22ε, (b) the current flowing through the coil 22ε, (c) the flux linkage of the coil 22ε, (d) the radial force generated in stator teeth of the SR motor, (e) the inductance of the coil 22ε. It should be noted that, in the graph (b) for the prior art, the command current iε* and a hysteresis band ΔI of the hysteresis comparator are both shown.

As shown in FIG. 10, in the present embodiment, the applied voltage to the coil 22ε having a sinusoidal waveform leads to moderate changes in the flux linkage, which leads to reduction in harmonic loss of the SR motor. Reduction in variation of the radial force can lead to reduction of the vibration and noise of the SR motor.

Figure 11A:
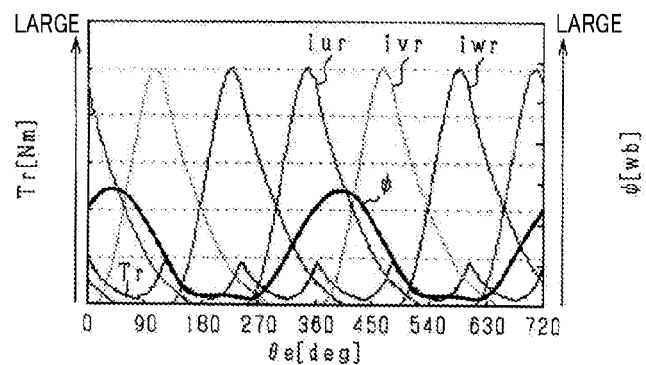
FIGS. 11A-11D show the effects of the voltage control process in accordance with the first embodiment.
Figure 11B:
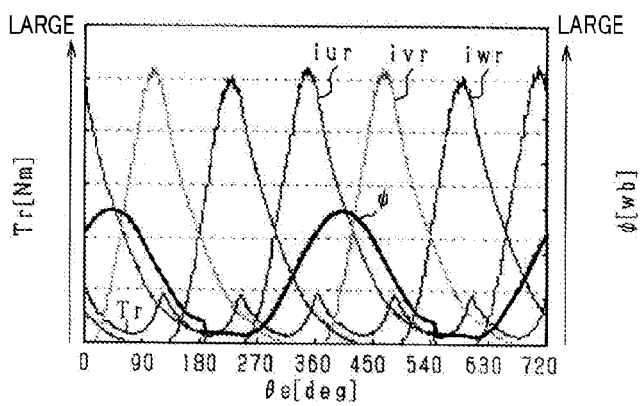
Figure 11C:
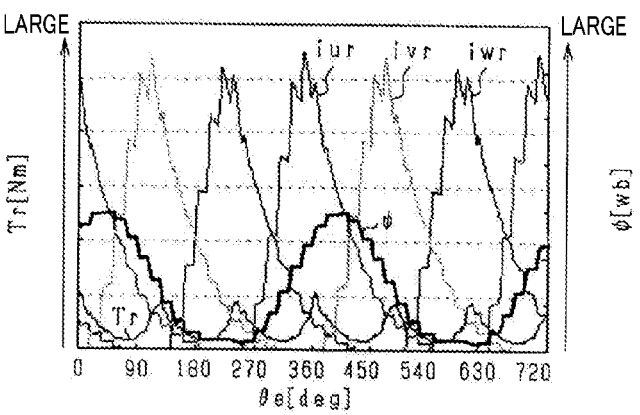
Figure 11D:
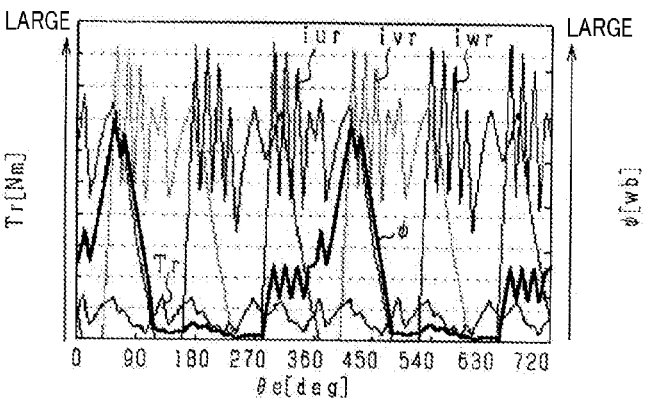

FIG. 11A-11D show the courses of the current iεr flowing through the coil 22, the flux linkage ψ and the output torque Tr of the SR motor. More specifically, FIG. 11A shows the courses when the applied voltage to the coil 22ε has an ideal sinusoidal waveform, FIG. 11B shows the courses when the carrier signal Cs has a frequency fc of 80 kHz in accordance with the present embodiment, FIG. 11C shows the courses when the carrier signal Cs has a frequency fc of 20 kHz in accordance with the present embodiment, and FIG. 11D shows the courses in accordance with the prior art.

As shown in FIG. 11A-11D, in the present embodiment, the flux linkage ψ changes more moderately as compared to the prior art. Particularly, the flux linkage iv changes more moderately for a higher frequency fc of the carrier signal Cs.

FIG. 12 shows losses of the SR motor for various test conditions respectively corresponding to FIGS. 11A-11D.

As shown in FIG. 12, in the present embodiment, among the losses of the SR motor, an eddy-current loss in the stator of the SR motor and an eddy-current loss in the rotor of the SR motor can be reduced significantly. Particularly, these eddy-current losses can be reduced more significantly for a higher frequency fc of the carrier signal Cs.

The present embodiment described above can provide the following benefits.

(1) In the present embodiment, the command voltage V$\epsilon$* for the coil 22$\epsilon$ ($\epsilon$=u, v, w) is set to have a sinusoidal waveform during both the ramp-up and ramp-down periods. The command voltage V$\epsilon$* for the coil 22$\epsilon$ ($\epsilon$=u, v, w) is further set to be continuous within one cycle of the electric angle $\theta$e. This can lead to moderate changes in the flux linkage $\psi\epsilon$ of the coil 22$\epsilon$ and can reduce harmonic components of the flux linkage $\theta$e. This can advantageously reduce harmonic core losses, vibration and noise of the SR motor.

Particularly, in the present embodiment, such settings of the command voltage V$\epsilon$* can provide a large contribution to the reduction of the harmonic core losses, vibration and noise.

(2) In the present embodiment, the applied voltage to the coil 22$\epsilon$ is controlled to the command voltage V$\epsilon$* by turning on or off the upper-arm switching elements S$\epsilon$p and the lower-arm switching elements S$\epsilon$n by means of the pulse-width modulation based on the determination of whether or not the modulation signal $\alpha\epsilon$ is equal to or greater than the carrier signal Cs. This allows the applied voltage to the coil 22$\epsilon$ to be properly controlled to the command voltage V$\epsilon$*.

Second Embodiment

There will now be explained a second embodiment of the present invention. Only differences of the second embodiment from the first embodiment will be explained.

Figure 13A:
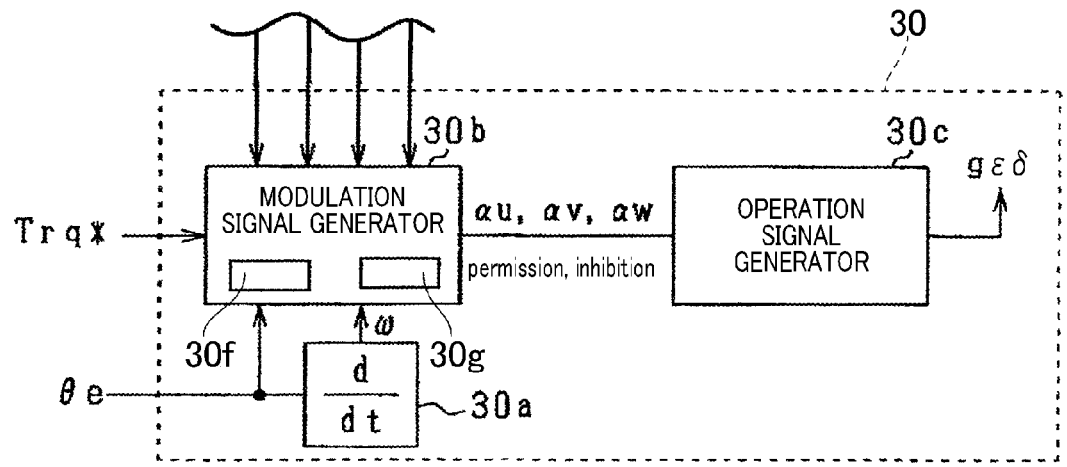
FIG. 13A shows a control apparatus in accordance with a second embodiment.
Figure 13B:
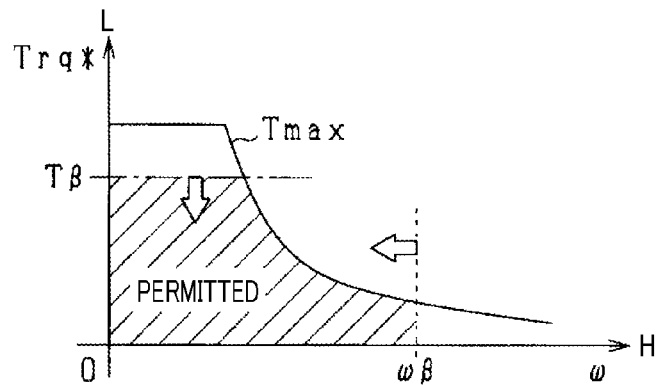
FIG. 13B shows an example of a region where a voltage control process is permitted in accordance with the second embodiment.

In the present embodiment, as shown in FIG. 13B, a region where the voltage control process described above is performed is limited with respect to the command torque Trq* and the electrical angular speed $\omega$ that is a rotation speed of the rotor of the SR motor. In FIG. 13B, the maximum torque is denoted by Tmax.

Figure 14:
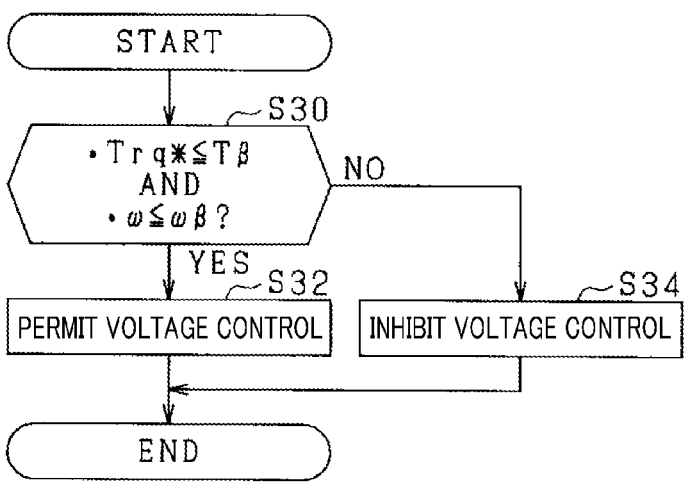
FIG. 14 shows a flowchart of a process of limiting a region where the voltage control process is permitted in accordance with the second embodiment.

FIG. 14 shows a flowchart of a process of limiting a region where the voltage control process is performed. This process is performed in the control apparatus 30 repeatedly every predetermined time interval.

First, in step S30, it is determined whether the command torque Trq* is equal to or less than a prescribed torque T$\beta$ and the electrical angular speed $\omega$ is equal to or less than a prescribed speed $\omega\beta$.

If it is determined in step S30 that the command torque Trq* is equal to or less than the prescribed torque T$\beta$ and the electrical angular speed $\omega$ is equal to or less than the prescribed speed $\omega\beta$, then the process proceeds to step S32, where the applied voltage to the coil 22$\epsilon$ is permitted to be controlled to the command voltage V$\epsilon$*.

FIG. 13A shows a control apparatus 30 in accordance with the second embodiment. The control apparatus 30 further includes a speed-range permitter 30$f$ and a torque-range permitter 30$g$. The speed-range permitter 30$f$ is configured to, when the electrical angular speed $\omega$ of the SR motor is equal to or less than the prescribed speed $\omega\beta$, permit the operation signal generator 30$c$ to control the applied voltage to the coil 22$\epsilon$ to the command voltage V$\epsilon$*. The torque-range permitter 30$g$ is configured to, when the command torque Trq* for the SR motor is equal to or less than the prescribed torque T$\beta$, permit the operation signal generator 30$c$ to control the applied voltage to the coil 22$\epsilon$ to the command voltage V$\epsilon$*. The speed-range permitter 30$f$ and the torque-range permitter 30$g$ are responsible for execution of the operations in steps in steps S30, S32.

Although the speed-range permitter 30$f$ and the torque-range permitter 30$g$ are depicted in FIG. 13A as being included in the modulation signal generator 30$b$, it should be recognized they can be disposed outside the modulation signal generator 30$b$, but in the control apparatus 30.

If it is determined in step S30 that the command torque Trq* is greater than the prescribed torque T$\beta$ or the electrical angular speed $\omega$ is greater than the prescribed speed $\omega\beta$, then the process proceeds to step S34, where the applied voltage to the coil 22$\epsilon$ is inhibited from being controlled to the command voltage V$\epsilon$*. In step S34, for example, the detected current i$\epsilon$r may be controlled to a command current i$\epsilon$* having a square waveform, as described in Japanese Patent No. 3255167.

After the operation in step S32 or step S34 is performed, the process is ended.

The present embodiment can provide similar benefits as provided in the first embodiment.

(3) Given the command torque Trq* equal to or less than the prescribed torque T$\beta$, the applied voltage to the coil 22$\epsilon$ is permitted to be controlled to the gradually changing command voltage V$\epsilon$*. If the applied voltage to the coil 22$\epsilon$ is controlled to the gradually changing command voltage V$\epsilon$* even when the command torque Trq* is greater than the prescribed torque T$\beta$, the current flowing through the SR motor will increase, which may lead to damage to the SR motor. This is why the applied voltage to the coil 22$\epsilon$ is permitted to be controlled to the gradually changing command voltage V$\epsilon$* only when the command torque Trq* is equal to or less than the prescribed torque T$\beta$. This may prevent the SR motor from being damaged.

(4) Given the electrical angular speed $\omega$ equal to or less than the prescribed speed $\omega\beta$, the applied voltage to the coil 22$\epsilon$ is permitted to be controlled to the gradually changing command voltage V$\epsilon$*. A time period for one cycle of the electric angle $\theta$e decreases with an increasing electric angular speed $\omega$. Accordingly, if the command voltage V$\epsilon$* is changed gradually although the electrical angular speed $\omega$ is high, the flux linkage $\psi\epsilon$ may not increase fully enough to generate the command torque Trq*. That is, the output torque of the SR motor may not reach the command torque Trq*. This is why the applied voltage to the coil 22$\epsilon$ is controlled to the gradually changing command voltage V$\epsilon$* only when the electrical angular speed $\omega$ equal to or less than the prescribed speed $\omega\beta$. This may prevent shortages of the outpt torque of the SR motor from being damaged.

Third Embodiment

There will now be explained a third embodiment of the present invention. Only differences of the third embodiment from the first embodiment will be explained.

Figure 15:
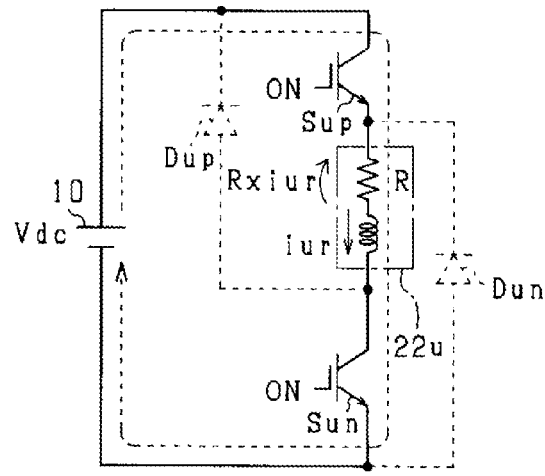
FIG. 15 shows a closed circuit formed when a positive voltage is applied to a coil in accordance with a third embodiment.

In the present embodiment, a modulation signal $\alpha\epsilon$ is generated so as to compensate for a voltage drop due to the presence of a resistance r of the coil 22$\epsilon$. FIG. 15 shows an example of a voltage drop caused by the presence of a resistance r of the U-phase a coil 22$u$.

Figure 16:
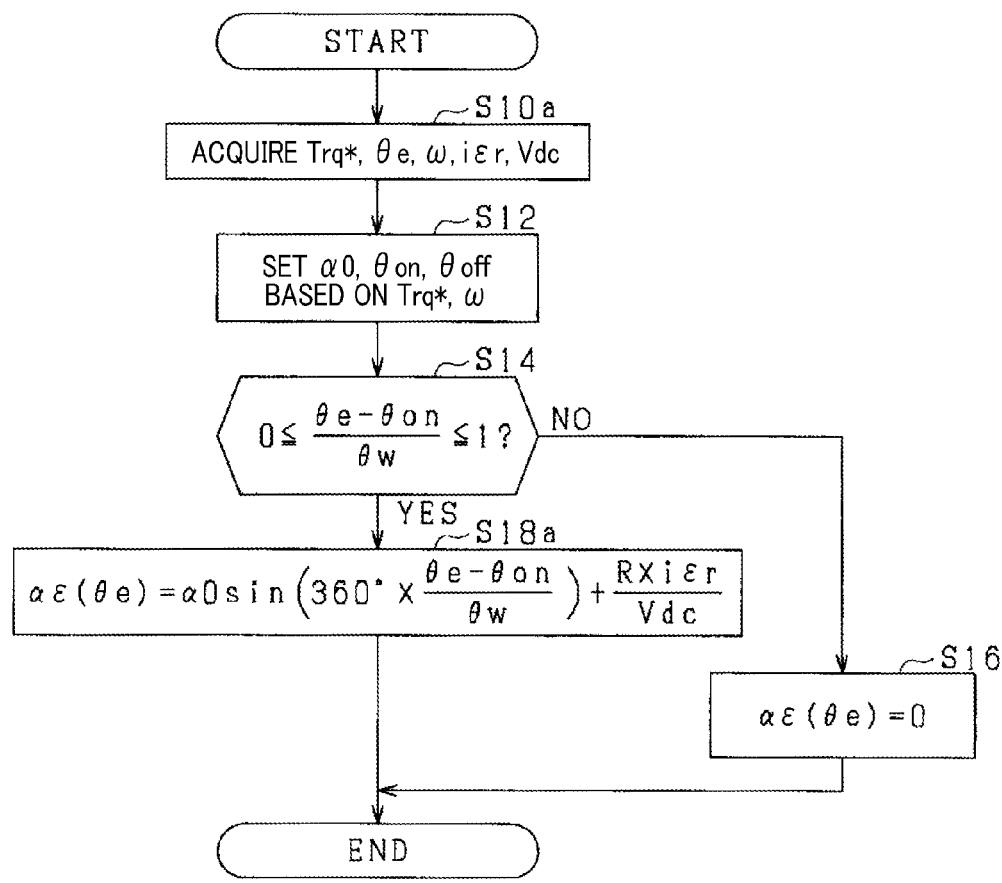
FIG. 16 shows a flowchart of a modulation signal generation process in accordance with the third embodiment.

FIG. 16 shows a flowchart of a process of generating the modulation signal in accordance with the present embodiment. This process is performed in the operation signal generator 30$c$ of the control apparatus 30 repeatedly every predetermined time interval.

In FIG. 16, the same operations as in FIG. 5 are assigned the same numbers.

First, in step S10$a$, in addition to the command torque Trq*, the electrical angle $\theta$e and the electrical angular speed $\omega$, an $\epsilon$-phase detected current i$\epsilon$r and a DC voltage Vdc detected by the voltage sensor 34 are acquired.

Subsequently to step S10$a$, the process proceeds to step S12 and then to step S14. If it is determined in step S14 that the determination parameter is equal to or greater than zero and equal to or less than one, then the process proceeds to step S18$a$, where a modulation signal $\alpha\epsilon$ is generated, which is the modulation signal $\alpha\epsilon$ as calculated in the first embodiment (see FIG. 5) plus a multiplication of the resistance r of the coil 22ε and the detected current iεr divided by the DC voltage Vdc.

After the operation in step S16 or step S18a is performed, the process is ended.

This can lead to a higher accuracy of setting the command voltage Vε*, which can enhance the effect of reducing harmonic core losses, vibration and noise of the SR motor.

Fourth Embodiment

There will now be explained a fourth embodiment of the present invention. Only differences of the fourth embodiment from the first embodiment will be explained.

In the present embodiment, in addition to positive and negative voltages, a zero voltage is used as the applied voltage to the coil 22ε.

Figure 17:
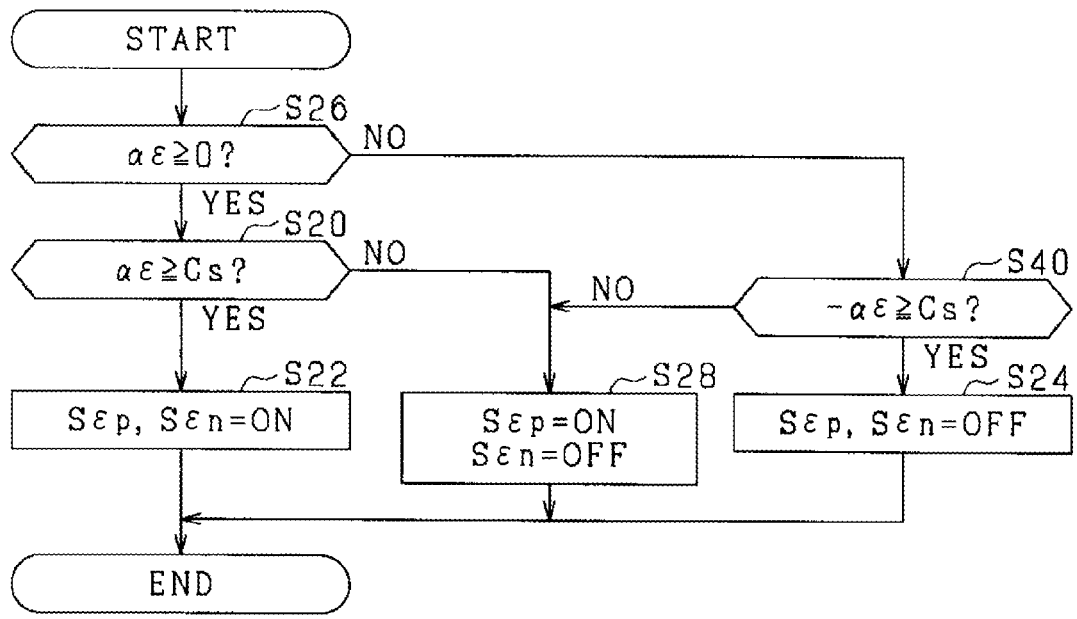
FIG. 17 shows a flowchart of a voltage control process in accordance with a fourth embodiment.

FIG. 17 shows a flowchart of a voltage control process in accordance with the present embodiment. This process is performed in the operation signal generator 30c of the control apparatus 30 repeatedly every predetermined time interval. In FIG. 17, the same operations as in FIG. 6 are assigned the same numbers.

First, in step S26, it is determined whether or not the modulation signal αε is equal to or greater than 0.

Figure 18:
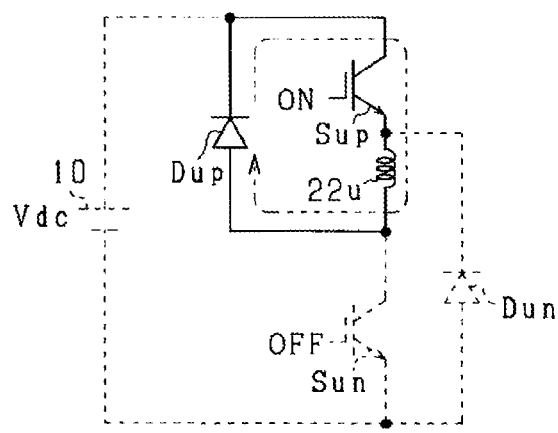
FIG. 18 shows a closed circuit formed when a zero voltage is applied to the coil in accordance with the fourth embodiment.

If it is determined in step S26 that the modulation signal αε is equal to or greater than zero, then in steps S20, S22 and S28, by means of the pulse-width modulation based on the determination of whether or not the modulation signal αε is equal to or greater than the carrier signal Cs, the lower-arm switching element Sεn is turned on or off while the upper-arm switching element Sεp is kept on. When the upper-arm switching element Sεp is turned on and the lower-arm switching element Sεn is tuned off, for example, as shown in FIG. 18 for the U-phase, a current flows through a closed circuit including the U-phase coil 22u, the U-phase upper-arm diode Dup and the U-phase upper-arm switching element Sup in this order and a zero voltage is applied to the U-phase a coil 22u. In the present embodiment, a minimum value of the carrier signal Cs is set to 0 and a maximum value of the carrier signal Cs is set to 1.

If is determined in step S26 that the modulation signal αε is less than 0, then in steps S24, S28, S40, by means of the pulse-width modulation based on the determination of whether or not the sign-reversed value of the modulation signal αε is equal to or greater than the carrier signal Cs, the upper-arm switching element Sεp is turned on or off while the lower-arm switching element Sεn is kept off.

After the operation in step S22, S24, or S28 is performed, the process is ended.

Figure 19A:
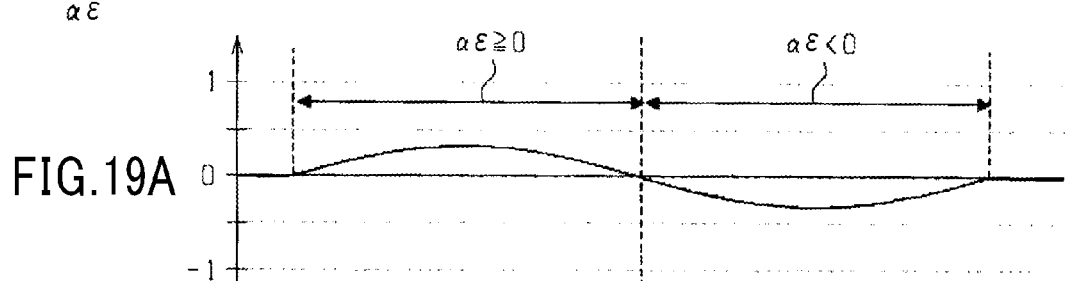
FIGS. 19A-19C show timing charts for an example of pulse-width modulation in accordance with the fourth embodiment.
Figure 19B:
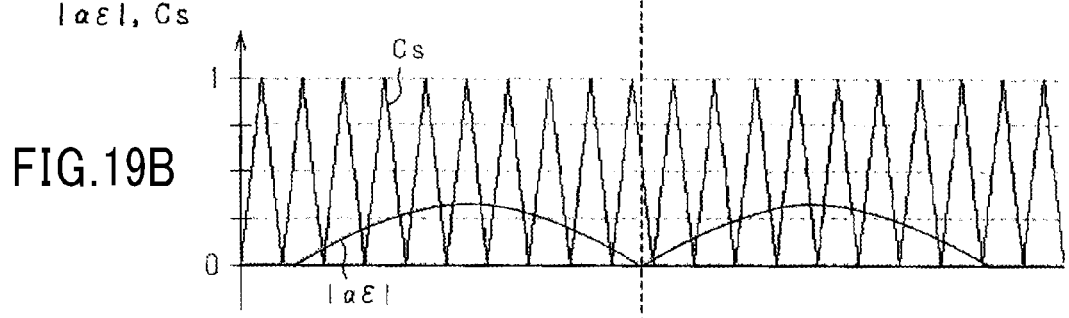
Figure 19C:
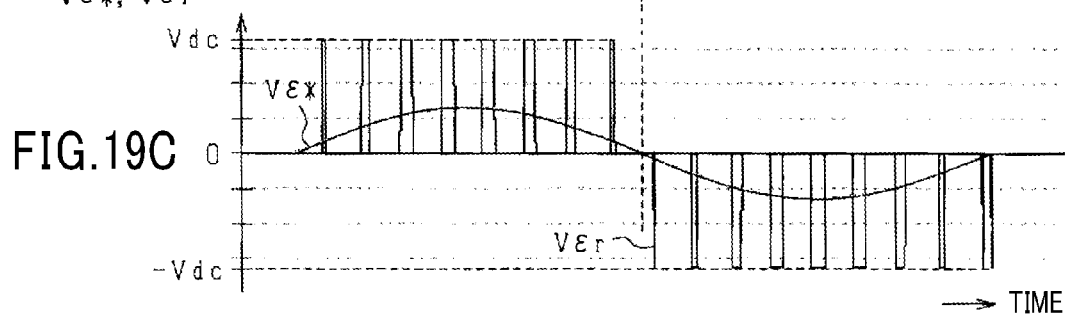

FIGS. 19A-19C show an example of the pulse-width modulation technique of the present embodiment based on the determination of whether or not the modulation signal αε is equal to or greater than the carrier signal Cs. More specifically, FIG. 19A shows the course of the modulation signal αε, FIG. 19B shows the courses of the absolute value of the modulation signal αε and the carrier signal Cs, and FIG. 19C shows the courses of the applied voltage Vεr of the coil 22ε and the command voltage Vε*.

As shown in FIGS. 19A-19C, in the present embodiment, with the operations of the upper-arm switching element Sεp and the lower-arm switching element Sεn, when the modulation signal αε is equal to or greater than zero, a positive voltage or a zero voltage is used as the applied voltage Vεr to the coil 22ε. When the modulation signal αε is less than 0, a negative voltage or a zero voltage is used as the applied voltage Vεr to the coil 22ε. Whether either of a positive voltage and a zero voltage is used as the applied voltage Vεr to the coil 22ε or either of a negative voltage and a zero voltage is used as the applied voltage Vεr to the coil 22ε is determined according to the sign of the modulation signal αε, which allows the average applied voltage of the coil 22ε for each cycle of the carrier signal Cs to be controlled more accurately to the command voltage Vε*. This allows a waveform of the flux linkage ψε of the coil 22ε to approximate a sinusoidal waveform, which allows for less harmonic core losses, vibration and noise of the SR motor.

Fifth Embodiment

There will now be explained a fifth embodiment of the present invention. Only differences of the fifth embodiment from the fourth embodiment will be explained.

In the fourth embodiment, the applied voltage to the coil 22ε is changed according to the sign of the modulation signal αε. Alternatively, in the present embodiment, a positive voltage or a zero voltage is used as the applied voltage to the coil 22ε during a first half of the energization period, and a negative voltage or a zero voltage is used as the applied voltage to the coil 22ε during a second half of the energization period, where the first half occurs prior to the second half.

Figure 20:
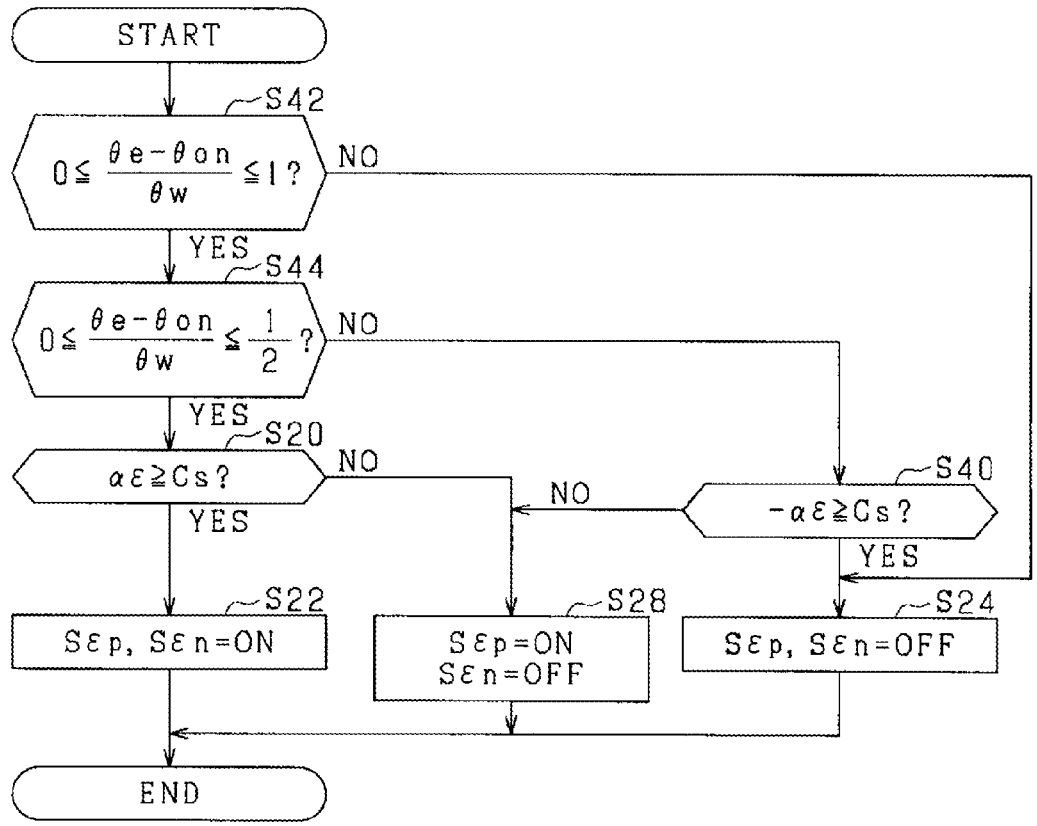
FIG. 20 shows a flowchart of a voltage control process in accordance with a fifth embodiment.

FIG. 20 shows a flowchart of a voltage control process in accordance with the present embodiment. This process is performed in the operation signal generator 30c of the control apparatus 30 repeatedly every predetermined time interval. In FIG. 20, the same operations as in FIG. 17 are assigned the same numbers.

First, in step S42, it is determined whether or not the determination parameter is equal to or greater than 0 and equal to or less than 1. If it is determined in step S42 that the determination parameter is less than 0 or greater than 1, then the process proceeds to step S24. If it is determined in step S42 that the determination parameter is equal to or greater than 0 and equal to or less than 1, then the process proceeds to step S44, where it is determined whether or not the determination parameter is equal to or greater than 0 and equal to or less than ½. The operation in step S44 is performed to determine the current electric angle θe is in the first half of the energization period.

If it is determined in step S44 that the determination parameter is equal to or greater than 0 and equal to or less than ½, then it is determined that the current electric angle θe is in the first half of the energization period. Thereafter, in steps S20, S22, S28, by means of the pulse-width modulation based on the determination of whether or not the modulation signal αε is equal to or greater than the carrier signal Cs, the lower-arm switching element Sεn is turned on or off while the upper-arm switching element Sεp is kept on.

If it is determined in step S44 that the determination parameter is greater than ½, then it is determined that the current electric angle θe is in the second half of the energization period. Thereafter, in steps S24, S28, S40, by means of the pulse-width modulation based on the determination of whether or not the sign-reversed value of the modulation signal αε is equal to or greater than the carrier signal Cs, the upper-arm switching element Sεn is turned on or off while the lower-arm switching element Sεp is kept off.

After the operation in step S22, S24, or S28 is performed, the process is ended.

As above, in the present embodiment, a positive voltage or a zero voltage is used as the applied voltage Vεr during the first half of the energization period while a negative voltage or a zero voltage is used as the applied voltage Vεr during the second half of the energization period. The present embodiment can provide similar benefits as provided in the fourth embodiment.

Sixth Embodiment

There will now be explained a sixth embodiment of the present invention. Only differences of the sixth embodiment from the fourth embodiment will be explained.

In the present embodiment, both when either of a positive voltage and a zero voltage is used as the applied voltage V∈r to the coil 22∈ and when either of a negative voltage and a zero voltage is used as the applied voltage V∈r to the coil 22∈, the upper-arm switching element S∈p is turned on or off while the lower-arm switching element S∈p is kept on or off.

Figure 21:
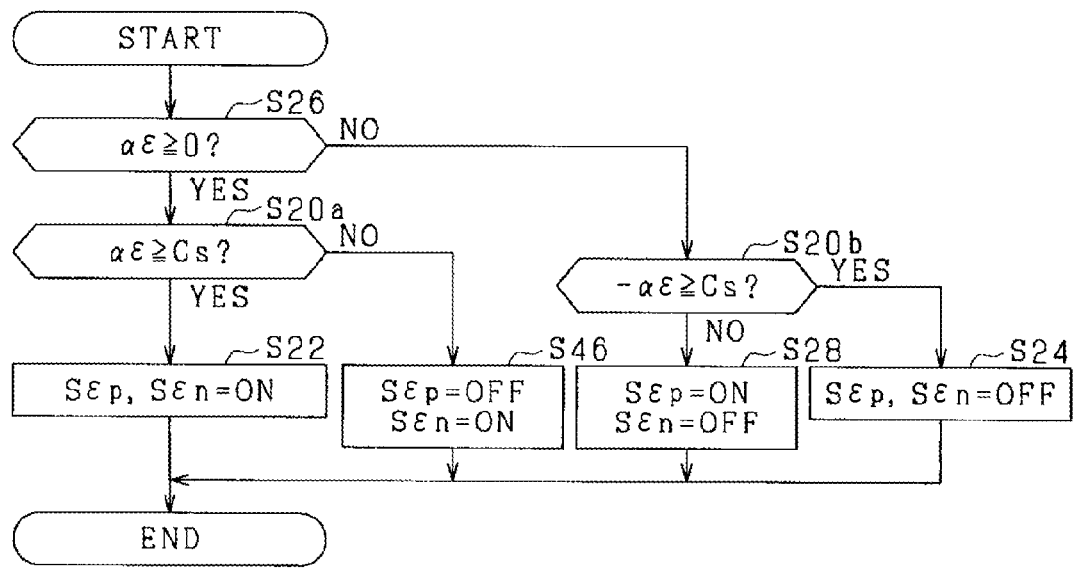
FIG. 21 shows a flowchart of a voltage control process in accordance with a sixth embodiment.

FIG. 21 shows a flowchart of a voltage control process in accordance with the present embodiment. This process is performed in the operation signal generator 30c of the control apparatus 30 repeatedly every predetermined time interval. In FIG. 21, the same operations as in FIG. 17 are assigned the same numbers.

If it is determined in step S26 that the modulation signal α∈ is equal to or greater than 0, then in steps S20a, S22, S46, by means of the pulse-width modulation based on the determination of whether or not the modulation signal α∈ is equal to or greater than the carrier signal Cs, the upper-arm switching element S∈p is turned on or off while the lower-arm switching element S∈n is kept on.

When the upper-arm switching element S∈p is turned off and the lower-arm switching element S∈n is turned on, a current flows through a closed circuit including the coil 22∈, the lower-arm diode DEn and the lower-arm switching element S∈n in this order, which also leads to a zero voltage applied to the coil 22∈.

If is determined in step S26 that the modulation signal α∈ is less than 0, then in steps S20b, S24, S28, by means of the pulse-width modulation based on the determination of whether or not the sign-reversed value of the modulation signal α∈ is equal to or greater than the carrier signal Cs, the upper-arm switching element S∈p is turned on or off while the lower-arm switching element S∈n is kept off.

The present embodiment can provide similar benefits as provided in the fourth embodiment.

Seventh Embodiment

There will now be explained a seventh embodiment of the present invention. Only differences of the seventh embodiment from the first embodiment will be explained.

In the present embodiment, the settings of the command voltage V∈* are modified. More specifically, as shown in FIG. 22, the command voltage V∈* is set such that a zero voltage waveform is inserted during the energization period of time t1 through t6. That is, the command voltage V∈* is set so as to have, within one cycle of the electric angle θe, for example, a period of time t1 through t7, a sinusoidal waveform during a period of time t1 through t3, a zero waveform during a period of time t3 through t4, a sinusoidal waveform during a period of time t4 through t6, a zero waveform during a period of time t6 through t7 in this order. Such settings of the command voltage V∈* also allow a waveform of the flux linkage ψ∈ to approach a sinusoidal waveform as shown in FIG. 22A. In the present embodiment, the modulation signal α∈ is the command voltage V∈* as shown in FIG. 22A divided by the DC voltage Vdc. In the present embodiment, a waveform of the command voltage V∈* during the period of time t1 through tA corresponds to a first waveform and a waveform of the command voltage V∈* during the period of time tA through t6 corresponds to a second waveform.

Such a zero voltage waveform inserted during the energization period within one cycle of the electric angle θe can increase an area of a region enclosed by the waveform of the flux linkage ψ∈ and the axis line defining ψ∈=0, which can lead to increase in average torque of the SR motor.

As described above, in the present embodiment, the command voltage V∈* is set such that a zero voltage waveform is inserted during the energization period within one cycle of the electric angle θe. Preferably, to reduce harmonic losses and the like of the SR motor, the flux linkage ψ∈ of the coil 22∈ has a sinusoidal waveform. Even in the presence of harmonic components in the waveform of the flux linkage ψ∈as shown in FIG. 23C, this leads to moderate changes in the flux linkage ψ∈. The present embodiment can provide similar benefits as provided in the first embodiment, It should be noted that FIG. 23A-23D respectively correspond to FIG. 10A-10C and 10E.

Eighth Embodiment

There will now be explained an eighth embodiment of the present invention. Only differences of the eighth embodiment from the seventh embodiment will be explained. In the seventh embodiment, it is assumed that the command modulation rate α0 is equal to or less than 1. Alternatively, in the present embodiment, the command modulation rate α0 may exceed 1 in an over-modulation region. A voltage control process of the present embodiment will now be explained with reference to FIG. 24A-24B. More specifically, as shown in FIG. 24A, the command voltage V∈* is set so as to have, within one cycle of the electric angle θe, for example, a period of time t1 through t9, a sinusoidal waveform during a period of time t1 through t2, a horizontal line waveform defining V∈* =a positive constant during a period of time t2 through t3, a sinusoidal waveform during a period of time t3 through t4, a zero waveform during a period of time t4 through t5, a sinusoidal waveform during a period of time t5 through t6, a horizontal line waveform defining V∈* =a negative constant during a period of time t6 through t7, a sinusoidal waveform during a period of time t7 through t8, and a zero waveform during a period of time t8 through t9 in this order. FIG. 25A-25D show the effect of the voltage control process in accordance with the present embodiment. FIG. 25A-25D respectively correspond to FIG. 23A-23D.

The present embodiment can provide similar benefits as provided in the seventh embodiment.

Ninth Embodiment

There will now be explained a ninth embodiment of the present invention. Only differences of the ninth embodiment from the first embodiment will be explained.

In the present embodiment, the applied voltage to the coil 22∈ is controlled to the command voltage V∈* not by means of the pulse-width modulation, but by means of the pulse-amplitude modulation.

Figure 26:
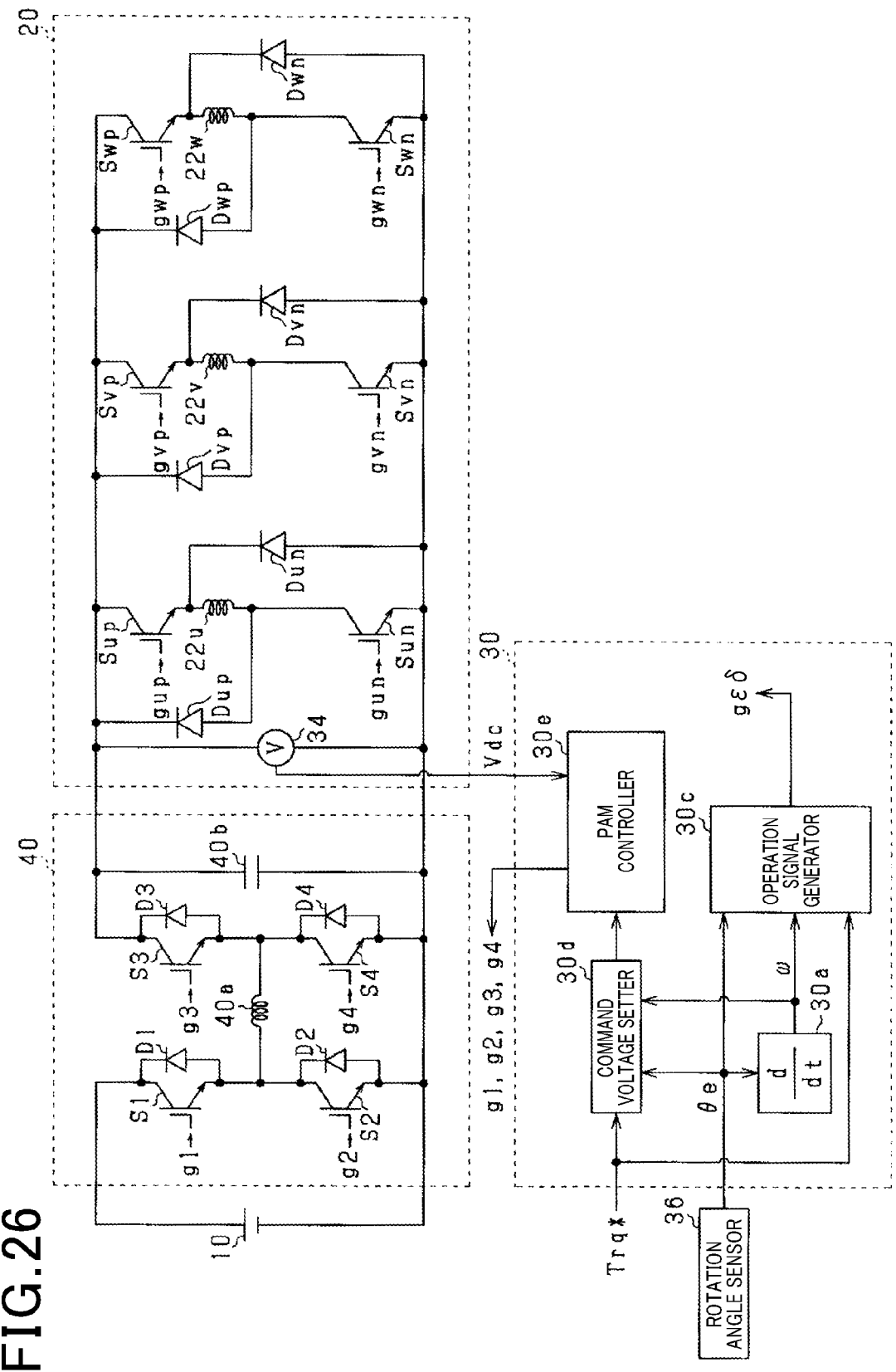
FIG. 26 shows a SR motor control system in accordance with a ninth embodiment.

FIG. 26 shows an overall configuration of a control system for the SR motor in accordance with the present embodiment. Elements having similar functions as in the first embodiment (see FIG. 1) are assigned the same numbers.

As shown in FIG. 26, the control system of the present embodiment includes, in addition to the power conversion circuit 20, an up-down converter 40 electrically connected to the input side of the power conversion circuit 20 to step up or step down the DC voltage of the voltage high-voltage battery 10 to apply an output voltage to the power conversion circuit 20. The up-down converter 40 includes first through fourth switching elements S1 through S4, first through fourth freewheel diodes D1 through D4 respectively electrically connected in anti-parallel with the switching elements S1 through S4, a convertor coil 40a and a smoothing capacitor 40b. In the present embodiment, each of the first through fourth switching elements S1 through S4 is an IGBT. A circuit configuration of the up-down converter 40 will now be explained in more detail. An emitter of the first switching element S1 is electrically connected to a collector of the second switching element S2. An emitter of the third switching element S3 is electrically connected to a collector of the fourth switching element S4. A junction between the first switching element S1 and the second switching element S2 and a junction between the third switching element S3 and the fourth switching element S4 are electrically connected to each other through the coil 40a. A series connection of the first switching element S1 and the second switching element S2 is electrically connected in parallel with the high-voltage battery 10. A series connection of the third switching element S3 and the fourth switching element S4 is electrically connected in parallel with the smoothing capacitor 40b.

The control apparatus 30 of the present embodiment includes an electrical angular speed calculator 30a, an operation signal generator 30c, a command voltage setter 30d and a PAM controller 30e. The command voltage setter 30d generates a command voltage $V\epsilon^*$ ($\epsilon$=u, v, w) on the basis of the received command torque $Trq^*$, the received electric angle $\theta e$ and the received electrical angular speed $\omega$. In the present embodiment, the command voltage $V\epsilon^*$ is controlled to have a sinusoidal waveform as shown in FIG. 2A of the first embodiment.

The PAM controller 30e controls a DC voltage Vdc detected by the voltage sensor 34 to a command voltage $V\epsilon^*$ by outputting operation signals g1 through g4 to the first through fourth switching elements S1 through S4, respectively, to turn on or off the respective switching elements S1 through S4. More specifically, the PAM controller 30e alternately performs first and second processes to step up the DC voltage outputted from the high-voltage battery 10. In the first process, the first switching element S1 and the fourth a switching element S4 are both turned on and the second switching element S2 and the third switching element S3 are both turned off. In the second process, the first switching element S1 and the third switching element S3 are both turned on and the second switching element S2 and the fourth switching element S4 are both tuned off. Meanwhile, the PAM controller 30e alternately performs third and fourth processes to step down the DC voltage outputted from the high-voltage battery 10. In the third process, the first switching element S1 and the third switching element S3 are both turned on and the second switching element S2 and the fourth switching element S4 are both turned off. In the fourth process, the second switching element S2 and the third switching element S3 are both turned on and the first switching element S1 and the fourth switching element S4 are both tuned off. In the present embodiment, the PAM controller 30e and the operation signal generator 30c form a voltage controller.

Figure 27:
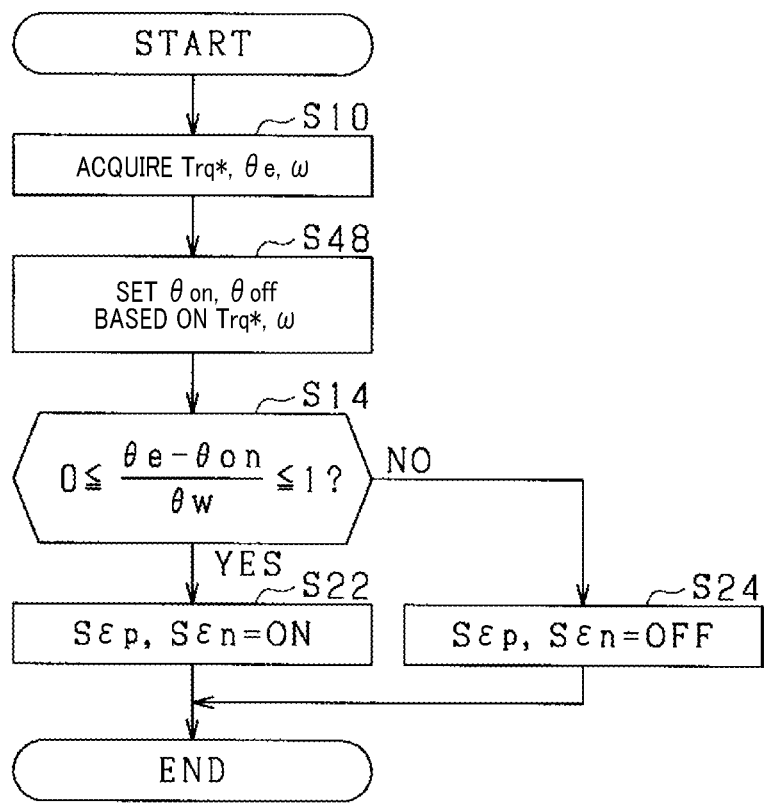
FIG. 27 shows a flowchart of a voltage control process in accordance with the ninth embodiment.

A process of operating the upper-arm switching element S$\epsilon$p and the lower-arm switching element S$\epsilon$n will now be explained with reference to FIG. 27. This process is performed in the operation signal generator 30c of the control apparatus 30 repeatedly every predetermined time interval. In FIG. 27, the same operations as in FIGS. 5 and 6 are assigned the same numbers.

After the operation in step S10 is performed, the process proceeds to step S48, where the ON-phase eon and the energization angular width $\theta w$ are set on the basis of the command torque $Trq^*$, the electrical angular speed $\omega$ acquired in step S10.

After the operation in step S48 is performed, if it is determined in step S14 that the determination parameter is equal to or greater than 0 and equal to or less than 1, then the process proceeds to step S22, where the upper-arm switching element S$\epsilon$p and the lower-arm switching element S$\epsilon$n are both turned on. Meanwhile, if it is determined in step S14 that the determination parameter is less than 0 or greater than 1, then the process proceeds to step S24, where the upper-arm switching element S$\epsilon$p and the lower-arm switching element S$\epsilon$n are both turned off.

After the operation in step S22 or S24 is performed, the process is ended.

FIG. 28 shows the courses of the flux linkage and others in accordance with the present embodiment. FIGS. 28A-28C respectively correspond to FIG. 25A-25C.

In the present embodiment, the applied voltage to the coil 22$\epsilon$ is controlled to the command voltage $V\epsilon^*$ by means of the pulse-amplitude modulation. This can prevent the current ripple due to switching operations in the power conversion circuit 20 from occurring as shown in FIG. 28B, which can lead to moderate changes in the flux linkage as shown in FIG. 28C. Accordingly, harmonic core losses and the like of the SR motor can be reduced.

Tenth Embodiment

There will now be explained a tenth embodiment of the present invention. Only differences of the tenth embodiment from the first embodiment will be explained.

In the present embodiment, as shown in FIGS. 29A-29B, the command voltage $V\epsilon^*$ is set to change gradually only during a time period where the command voltage $V\epsilon^*$ is negative. FIGS. 29A-29B respectively correspond to FIGS. 2A-2B.

The command voltage $V\epsilon^*$ is set to have, within one cycle of the electric angle $\theta e$, for example, a period of time t1 through t5, a square waveform during a period of time t1 through t2 and a sinusoidal waveform during a period of time t2 through t4. More specifically, during the period of time t1 through t2, the command voltage $V\epsilon^*$ is set to have a square waveform of a positive value. The flux linkage $\psi\epsilon$ thereby increases gradually from zero to a third amount of magnetic flux $\psi 3$ (as a fifth predetermined value) that is an upper limit at a constant increasing rate of the flux linkage $\psi\epsilon$.

The command voltage $V\epsilon^*$ is decreased gradually from zero to a third voltage V3 (as a fourth predetermined voltage) during a subsequent period of time t2 through t3 (as a fourth time period). The flux linkage $\psi\epsilon$ thereby decreases gradually to a fourth amount of magnetic flux $\psi 4$ (as a six or second predetermined value) while increasing a decreasing rate of the flux linkage $\psi\epsilon$. The command voltage $V\epsilon^*$ is discontinuous at times t1 and t2. In the present embodiment, the process of setting the command voltage $V\epsilon^*$ during the period of time t2 through t3 corresponds to a fourth process.

The command voltage $V\epsilon^*$ is increased gradually from the third voltage V3 to zero during a subsequent period of time t3 through t4 (as a second time period). The flux linkage $\psi\epsilon$ thereby decreases gradually to zero while decreasing the decreasing rate of the flux linkage $\psi\epsilon$. In the present embodiment, the process of setting the command voltage $V\epsilon^*$ during the period of time t3 through t4 corresponds to a second process.

The present embodiment as above can provide similar effects of reducing harmonic core losses, vibration and noise as provided in the first embodiment.

Eleventh Embodiment

There will now be explained an eleventh embodiment of the present invention. Only differences of the eleventh embodiment from the first embodiment will be explained.

In the present embodiment, as shown in FIGS. 30A-30B, the command voltage $V\epsilon^*$ is set to change gradually only during a time period where the command voltage $V\epsilon^*$ is positive. FIGS. 30A-30B respectively correspond to FIGS. 2A-2B.

The command voltage $V\epsilon^*$ is set to have, within one cycle of the electric angle $\theta e$, for example, a period of time t1 through t5, a sinusoidal waveform during a period of time t1 through t3 and a square waveform during a period of time t3 through t4. More specifically, the command voltage $V\epsilon^*$ is increased gradually from zero to a fourth voltage V4 (as a first or third predetermined voltage) that is an upper limit during the period of time t1 through t2 (as a first time period). The flux linkage $\psi\epsilon$ thereby increases gradually from zero to a fifth amount of magnetic flux $\psi 5$ (as a first or third predetermined value) while increasing an increasing rate of the flux linkage $\psi\epsilon$. In the present embodiment, the process of setting the command voltage $V\epsilon^*$ during the period of time t1 through t2 corresponds to a first process.

The command voltage $V\epsilon^*$ is decreased gradually from the fourth voltage V4 to zero during a subsequent period of time t2 through t3 (as a third time period). The flux linkage $\psi\epsilon$ thereby increases gradually from the fifth amount of magnetic flux $\psi 5$ to a sixth amount of magnetic flux $\psi 6$ (as a fourth predetermined value) that is an upper limit while decreasing the increasing rate of the flux linkage $\psi\epsilon$. In the present embodiment, the process of setting the command voltage $V\epsilon^*$ during the period of time t2 through t3 corresponds to a third process.

The command voltage $V\epsilon^*$ is set to have a square waveform of a negative value during a subsequent period of time t3 through t4.

The flux linkage $\psi\epsilon$ thereby decreases gradually from the sixth amount of magnetic flux $\psi 6$ to zero at a constant decreasing rate of the flux linkage $\psi\epsilon$. The command voltage $V\epsilon^*$ is discontinuous at times t3 and t4.

The present embodiment as above can provide similar effects of reducing harmonic core losses, vibration and noise as provided in the first embodiment.

Twelfth Embodiment

There will now be explained a twelfth embodiment of the present invention. Only differences of the twelfth embodiment from the first embodiment will be explained.

In the present embodiment, as shown in FIGS. 31A and 31B, the command voltage $V\epsilon^*$ is set to change gradually only during the first ramp-up period (of time t1 through t2) and the last ramp-up period (of time t3 through t4). FIGS. 31A and 31B respectively correspond to FIGS. 2A and 2B.

The command voltage $V\epsilon^*$ is set to have, within one cycle of the electric angle $\theta e$, for example, of time t1 through t5, a sinusoidal waveform during a period of time t1 through t2, a square waveform during a period of time t2 through t3, and a sinusoidal waveform during a period of time t3 through t4. More specifically, the command voltage $V\epsilon^*$ is increased gradually from zero to a fifth voltage V5 (as a first predetermined voltage) that is an upper limit during the period of time t1 through t2 (as a first time period). The flux linkage $\psi\epsilon$ thereby increases from zero to a seventh amount of magnetic flux $\psi 7$ (as a first predetermined value) while increasing an increasing rate of the flux linkage $\psi\epsilon$. In the present embodiment, the process of setting the command voltage $V\epsilon^*$ during the period of time t1 through t2 corresponds to a first process.

The command voltage $V\epsilon^*$ is set to have a square waveform of a fifth voltage V5 during a subsequent period of time t2 through tA. The flux linkage $\psi\epsilon$ thereby increases from the seventh amount of magnetic flux $\psi 7$ to an eighth amount of magnetic flux $\psi 8$ at a constant increasing rate of the flux linkage $\psi\epsilon$.

The command voltage $V\epsilon^*$ is set to have a square waveform of a negative sixth voltage V6 (<zero) during a subsequent period of time tA through t3. The flux linkage $\psi\epsilon$ thereby decreases gradually from the eighth amount of magnetic flux $\psi 8$ to the seventh amount of magnetic flux $\psi 7$ at a constant decreasing rate of the flux linkage $\psi\epsilon$. The command voltage $V\epsilon^*$ is discontinuous at time tA.

The command voltage $V\epsilon^*$ is increased gradually from the sixth voltage V6 to zero during a subsequent period of time t3 through t4 (as a second time period). The flux linkage $\psi\epsilon$ thereby decreases gradually to zero while decreasing the decreasing rate of the flux linkage $\psi\epsilon$. In the present embodiment, the process of setting the command voltage $V\epsilon^*$ during the period of time t3 through t4 corresponds to a second process. In the present embodiment, during the energization period (of time t1 through t4), a first waveform of the command voltage $V\epsilon^*$ during the period of time t1 through tA is directly followed by a second waveform of the command voltage $V\epsilon^*$ during the period of time tA through t4. The first and second waveforms of the command voltage $V\epsilon^*$ are symmetrical about an intersection point $\gamma$ as defined in the first embodiment.

The present embodiment as above can provide similar effects of reducing harmonic core losses, vibration and noise as provided in the first embodiment.

(Thirteenth Embodiment)

There will now be explained a thirteenth embodiment of the present invention. Only differences of the thirteenth embodiment from the first embodiment will be explained.

In the present embodiment, as shown in FIG. 32A, the command voltage $V\epsilon^*$ is set to change gradually only during a ramp-down period (of time t2 through t3 ). FIGS. 32A and 32B respectively correspond to FIGS. 2A and 2B.

The command voltage $V\epsilon^*$ is set to have, within one cycle of the electric angle $\theta e$, for example, a period of time t1 through t5 , a square waveform during a period of time t1 through t2, a sinusoidal waveform during a period of time t2 through t3, and a square waveform during a period of time t3 through t4. More specifically, during the period of time t1 through t2, the command voltage $V\epsilon^*$ is set to have a square waveform of a seventh voltage V7 that is positive. The flux linkage $\psi\epsilon$ thereby increases gradually from zero to a ninth amount of magnetic flux $\psi 9$ at a constant increasing rate of the flux linkage $\psi\epsilon$. The command voltage $V\epsilon^*$ is discontinuous at time t1.

The command voltage $V\epsilon^*$ is decreased gradually from the seventh voltage V7 to zero during a subsequent period of time t2 through tA (as a third time period). The flux linkage $\psi\epsilon$ thereby increases gradually from the ninth amount of magnetic flux $\psi 9$ to a tenth amount of magnetic flux $\psi 10$ (as a fourth or fifth predetermined value) that is an upper limit while decreasing the increasing rate of the flux linkage $\psi\epsilon$. In the present embodiment, the process of setting the command voltage $V\epsilon^*$ during the period of time t2 through tA corresponds to a third process.

The command voltage $V\epsilon^*$ is decreased gradually from zero to an eighth voltage V8 (as a fourth predetermined voltage) during a subsequent period of time tA through t3 (as a fourth time period). The flux linkage $\psi\epsilon$ thereby decreases gradually to the ninth amount of magnetic flux $\psi 9$ (as a sixth predetermined value) while increasing the decreasing rate of the flux linkage ψϵ. In the present embodiment, the process of setting the command voltage Vϵ* during the period of time tA through t3 corresponds to a fourth process. The command voltage Vϵ* is set to have a square waveform of the eighth voltage V8 during a subsequent period of time t3 through t4. The flux linkage ψϵ thereby decreases gradually from the ninth amount of magnetic flux ψ9 to zero at a constant decreasing rate of the flux linkage ψϵ. The command voltage Vϵ* is discontinuous at times t3 and t4.

In the present embodiment, during the energization period (of time t1 through t4), a first waveform of the command voltage Vϵ* during the period of time t1 through tA is directly followed by a second waveform of the command voltage Vϵ* during the period of time tA through t4. The first and second waveforms of the command voltage Vϵ* are symmetrical about an intersection point γ as defined in the first embodiment.

As above, in the present embodiment, the fourth process is performed subsequently to the third process. The voltage control process of the present embodiment can provide a greater effect of reducing harmonic losses than in the first embodiment (see FIG. 2), and the tenth through twelfth embodiments (see FIGS. 29-31). This effect will now be explained with reference to FIGS. 33-35.

Figure 33:
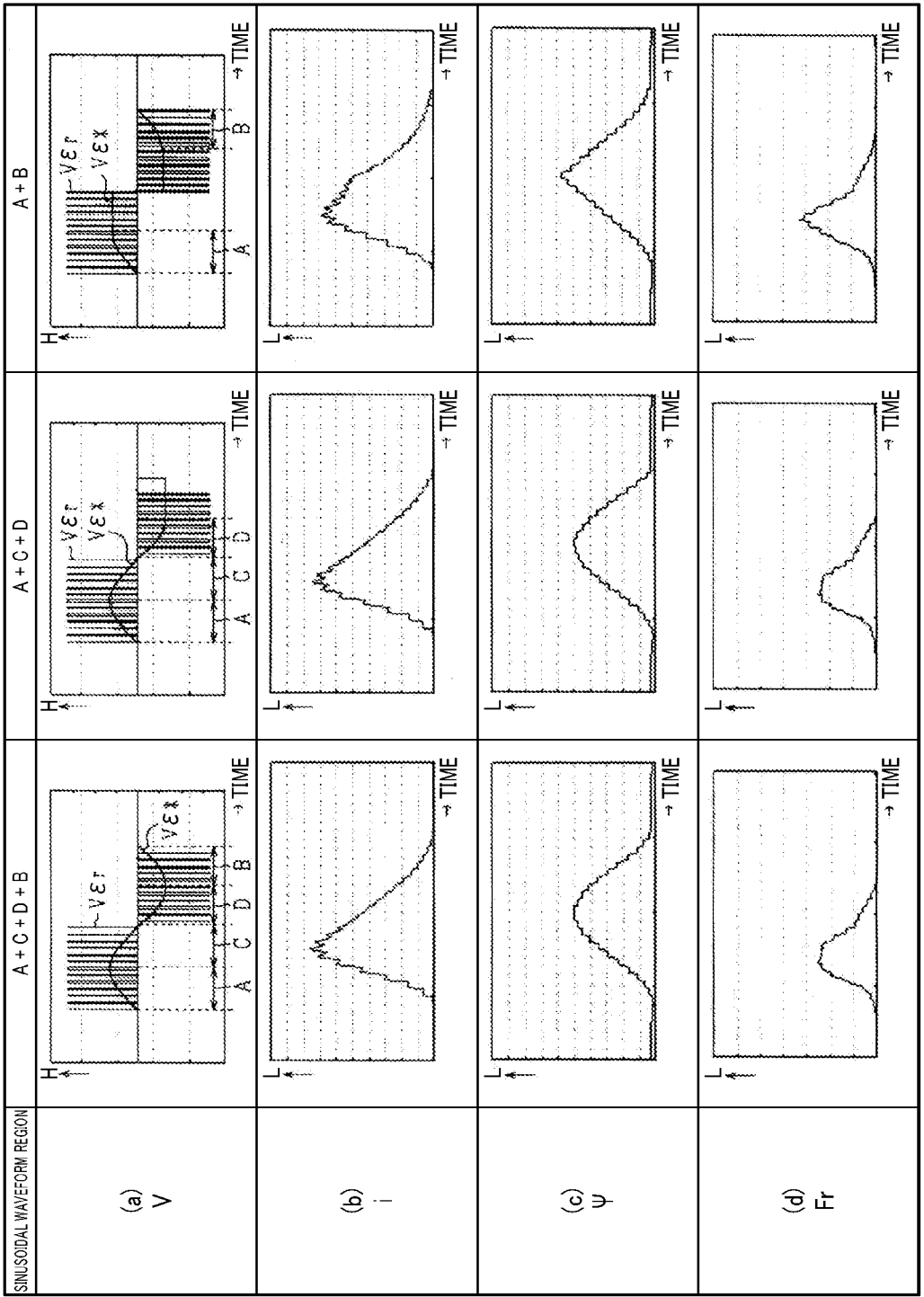
FIG. 33 shows the effects of reducing core losses in accordance with the thirteenth embodiment.
Figure 34:
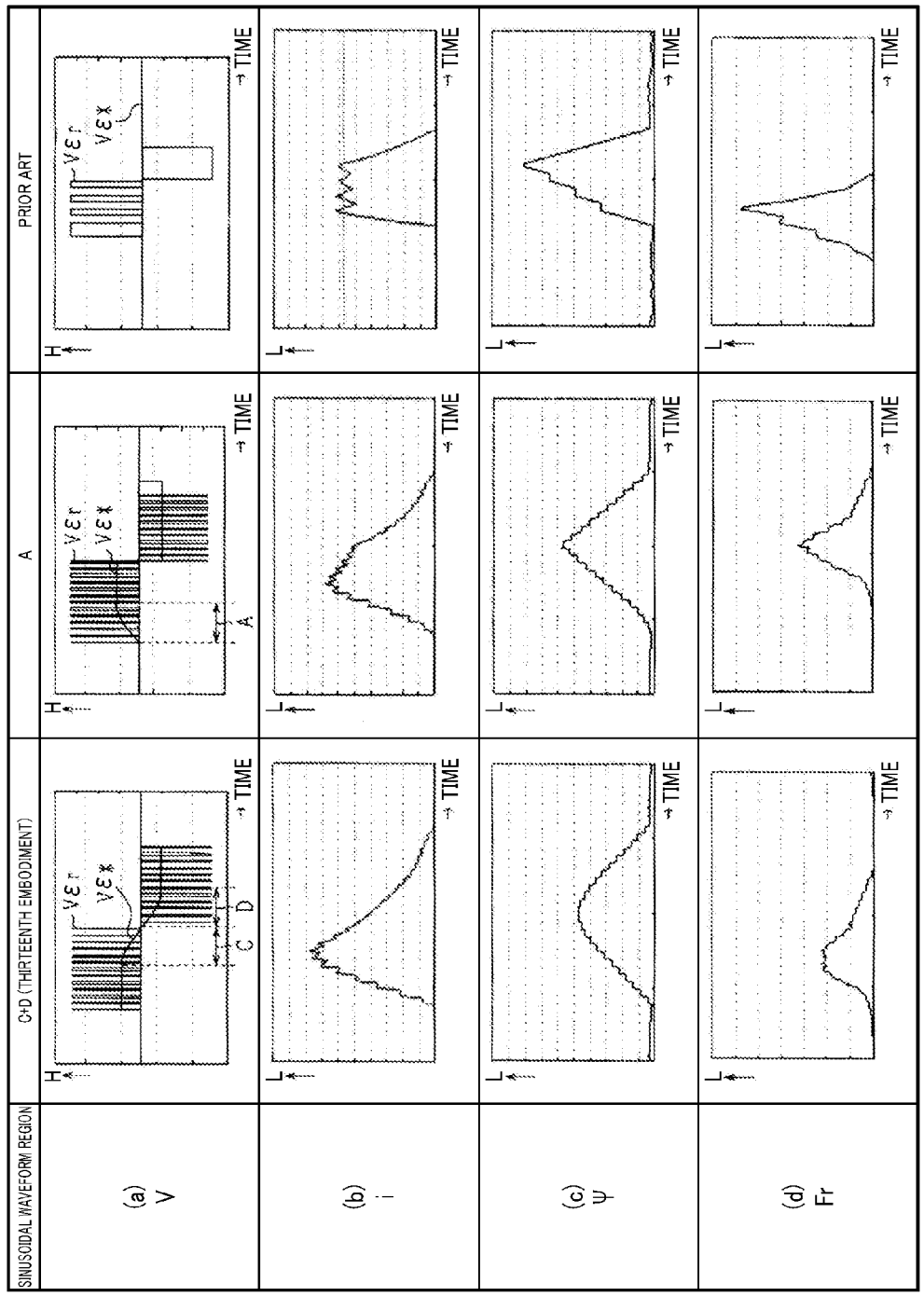
FIG. 34 shows the effects of reducing core losses in accordance with the thirteenth embodiment.

FIGS. 33 and 34 show calculation results for (a) the command voltage Vϵ* and the applied voltage Vϵr for the coil 22ϵ, (b) the current i flowing through the coil 22; (c) the flux linkage ψ of the coil 22 ϵ; (d) the radial force Fr generated in the stator tooth of the SR motor. The time periods "A", "B", "C", and "D" in FIGS. 33 and 34 respectively represent the first, second, third, and fourth time periods. The period "A+C+D+B" in FIG. 33 corresponds to FIG. 2 in the first embodiment, the period "A+B" in FIG. 33 corresponds to FIG. 31 in the twelfth embodiment, the period "C+D" in FIG. 34 represents FIG. 32 in the present embodiment. Only five example combinations of the time periods "A", "B", "C", and "D" are shown in FIGS. 33 and 34 although the total of fifteen combinations of them are available.

FIG. 35 shows calculation results obtained from FIGS. 33 and 34, in which the total core loss of the prior art is set at unity (100%).

As shown in FIG. 35, in the present embodiment, the effect of reducing the core losses may be increased significantly.

(Fourteenth Embodiment)

There will now be explained a fourteenth embodiment of the present invention. Only differences of the fourteenth embodiment from the first embodiment will be explained.

In the present embodiment, as shown in FIGS. 36A-36B, the command voltage Vϵ* is set such that, during the energization period θw of time t1 through t3, an area Sp of a region enclosed by the first axis line L1 and a sinusoidal waveform of the command voltage Vϵ* on the positive voltage side of the first axis line L1 (referred to as positive voltage side region) is greater than an area Sn of a region enclosed by the first axis line L1 and the sinusoidal waveform of the command voltage Vϵ* on the negative voltage side of the first axis line L1 (referred to as a negative voltage side region) and an absolute value of a difference between the area Sn and the area Sp is equal to or less than a predefined value ΔS. In the present embodiment, a duration tp of the period (of time t1 through t2) in which the command voltage Vϵ* is positive is set equal to a duration to of the period (of time t2 through t3) in which the command voltage Vϵ* is negative. FIGS. 36A-36B respectively correspond to FIGS. 2A-2B.

Figure 37A:
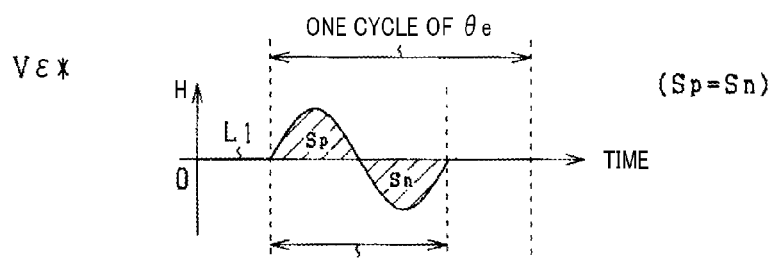
FIGS. 37A-37C show benefits in differentiating an area Sp of a positive voltage side region and an area Sn of a negative voltage side region in accordance with the fourteenth embodiment.

Such settings of the command voltage Vϵ* are intended to prevent the current flowing through the coil 22ϵ from becoming zero before expiration of the energization period θw, which will now be explained with reference to FIGS. 37A-37C. FIG. 37A corresponds to FIG. 2A, the dashed line in FIG. 37B corresponds to the solid line in FIG. 2B. FIG. 37C shows the current flowing through the coil 22ϵ.

Figure 37B:
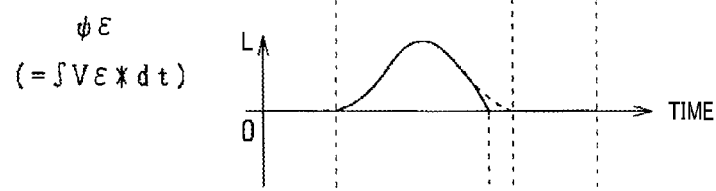
Figure 37C:
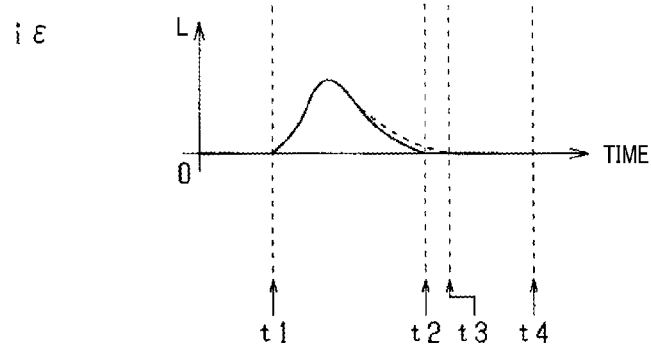

In the first embodiment, with the settings of the command voltage Vϵ* as shown in FIG. 37A, the flux linkage ψϵ of the coil 22ϵ becomes zero at the expiration time t3 of the energization period θw as indicated by the dashed line in FIG. 37B. However, as indicated by a solid line in FIG. 37B, the flux linkage ψϵ may become zero at time t2 prior to time t3. Supposing, for example, that FIG. 37B shows the flux leakage of the U-phase coil 22ϵ, this may be caused by the effects of flux leakages of the V-phase and W-phase coils. Such phenomena may reduce the effects of reducing harmonic core losses, vibration and noise of the SR motor.

To address such problems, the command voltage Vϵ* having a sinusoidal waveform is distorted so that the area Sn and the area Sp becomes different from each other. In the present embodiment, the area Sn is set less than the area Sp. It has been found by the present inventor that, with such settings of the command voltage Vϵ*, the current doesn't become zero before expiration of the energization period θw when the SR motor operates as an electrical motor (in a motoring mode). Further, in the present embodiment, the command voltage Vϵ* is set such that the absolute value of the difference between the area Sn and the area Sp is set equal to or less than the predefined value ΔS. This is because a greater difference between the area Sn and the area Sp may become unable to avoid such phenomena.

The present embodiment as described above can prevent reduction of the effects of reducing harmonic core losses or the like of the SR motor due to the flux leakages or the like.

Fifteenth Embodiment

There will now be explained a fifteenth embodiment of the present invention. Only differences of the fifteenth embodiment from the fourteenth embodiment will be explained.

In the present embodiment, as shown in FIG. 38, the command voltage Vϵ* having a sinusoidal waveform is set such that the area Sp is greater than the area Sn, where the areas Sp, Sn are defined in a similar manner as in the fourteenth embodiment. Further, in the present embodiment, a duration tp of the time period (of time t1 through t2) in which the command voltage Vϵ* is positive is set greater than a duration to of the time period (of time t2 through t3) in which the command voltage Vϵ* is negative. FIG. 38A-38B respectively correspond to FIG. 36A-36B.

The present embodiment can provide similar benefits as provided in the fourteenth embodiment.

VARIATIONS

There will now be explained some variations of each of the first to fifteenth embodiments that may be devised without departing from the spirit and scope of the present invention.

The settings of the command voltage Vϵ* are not limited to those of the first, seventh or eighth embodiment. For example, the command voltage Vϵ* may be set to have, within one cycle of the electric angle θe, at least one of various polygonal waveforms, such as a sinusoidal waveform, a triangular waveform, a trapezoidal waveform and an N-gonal waveform (where N is equal to or greater than 4). The triangular waveform, the trapezoidal waveform and the N-gonal waveform (where N is equal to or greater than 4) are included in polygonal waveforms. Examples (A) through (3) will now be explained in the following.

(A) When the command modulation rate α0 exceeds 1 in an over-modulation region in the first embodiment, the command voltage Vε* may set as shown in FIGS. 39A and 39B. More specifically, the command voltage Vε* may be set to have, within one cycle of the electric angle θe, for example, a period of time t1 through t7, a sinusoidal waveform during a period of time t1 through t2, a linear waveform of a positive constant value during a period of time t2 through t3, a sinusoidal waveform during a period of time t3 through t4, a linear waveform of a negative constant value during a period of time t4 through t5, a sinusoidal waveform during a period of time t5 through t6, and a zero voltage waveform during a period of time t6 through t7. Such a variation can provide similar benefits as in the first embodiment.

(B) As shown in FIGS. 40A and 40B, the command voltage Vε* may be set to include, within one cycle of the electric angle θe, a pair of triangular waveforms (during a period of time t1 through t4). More specifically, the command voltage Vε* may be set to have, within one cycle of the electric angle θe, for example, a period of time t1 through t5, a triangular waveform during a period of time t1 through tA as a first waveform, a triangular waveform during a period of time tA through t4 as a second waveform, and a zero voltage waveform during a period of time t4 through t5.

(C) The settings of the command voltage Vε* as shown in FIGS. 40A and 40B may be modified such that a zero voltage waveform is inserted during the energization period (of time 1 through t6). In FIGS. 41A and 41B, the command voltage Vε* may be set to have, within one cycle of the electric angle θe, for example, a period of time t1 through t7, a triangular waveform during a period of time t1 through t3, a zero voltage waveform during a period of time t3 through t4, a triangular waveform during a period of time t4 through t6, and a zero voltage waveform during a period of time t6 through t7. In such a variation as shown in FIG. 41A, the command voltage Vε includes a waveform during a period of time t1 through tA as a first waveform and a waveform during a period of time to through t6 as a second waveform.

(D) As shown in FIGS. 42A and 42B, the command voltage Vε* may be set to include, within one cycle of the electric angle θe, a pair of trapezoidal waveforms (during a period of time t1 through t6). More specifically, the command voltage Vε* may be set to have, within one cycle of the electric angle θe, for example, a period of time t1 through t7, a trapezoidal waveform during a period of time t1 through tA as a first waveform, a trapezoidal waveform during a period of time tA through t6 as a second waveform, and a zero voltage waveform during a period of time t6 through t7.

(E) The settings of the command voltage Vε* as shown in FIGS. 42A and 42B may be modified such that a zero voltage waveform is inserted during the energization period (of time t1 through t8). In FIGS. 43A and 43B, the command voltage Vε* may be set to have, within one cycle of the electric angle θe, for example, a period of time t1 through t9, a trapezoidal waveform during a period of time t1 through t4, a zero voltage waveform during a period of time t4 through t5, a trapezoidal waveform during a period of time t5 through t8, and a zero voltage waveform during a period of time t8 through t9. In such a variation as shown in FIG. 43A, the command voltage Vε includes a waveform during a period of time t1 through tA as a first waveform and a waveform during a period of time tA through t8 as a second waveform.

(F) As shown in FIGS. 44A and 44B, the command voltage Vε* may be set to include, within one cycle of the electric angle θe (for example, of time t1 through t6), a sinusoidal waveform during a period of time t1 through t3 and a triangular waveform during a period of time t3 through t5.

(G) As shown in FIGS. 45A and 45B, the command voltage Vε* may be set to include, within one cycle of the electric angle θe (for example, of time t1 through t6), a sinusoidal waveform (during a period of time t1 through t2), a linear waveform with negative slope (during a period of time t2 through t4), and a sinusoidal waveform (during a period of time t4 through t5). In such a variation as shown in FIG. 45A, the command voltage VE includes a waveform during a period of time t1 through tA as a first waveform and a waveform during a period of time tA through t5 as a second waveform.

(H) As shown in FIGS. 46A and 46B, the command voltage Vε* may be set to include, within one cycle of the electric angle θe, for example, a period of time t1 through t6, a sinusoidal waveform during a period of time t1 through t2, a linear waveform with negative slope during a period of time t2 through t3, and a triangular waveform during a period of time t3 through t5.

(I) As shown in FIGS. 47A and 47B, the command voltage Vε* may be set to include, within one cycle of the electric angle θe, for example, a period of time t1 through t7, a sinusoidal waveform during a period of time t1 through t3, a zero voltage waveform during a period of time t3 through t4, and a triangular waveform during a period of time t4 through t6.

(J) As shown in FIGS. 48A and 48B, the command voltage Vε* may be set to include, within one cycle of the electric angle θe, for example, a period of time t1 through t5, an N-gonal waveform during a period of time t1 through tA as a first waveform and an N-gonal waveform during a period of time tA through t4 as a second waveform.

Further variations with respect to the settings of the command voltage Vε* may be provided as follows.

The command voltage Vε* may be set to change gradually during either of a ramp-up period and a ramp-down period. This can lead to moderate changes in the flux linkage during either of the ramp-up period and the ramp-down period although the waveform of the command voltage Vε* may be discontinuous within one cycle of the electric angle θe. This can reduce harmonic core losses, vibration and noise of the SR motor.

The waveforms of the command voltage Vε* that appear within one cycle of the electric angle θe are not limited to the ideal sinusoidal waveform and the N-gonal waveform used in the variations (A) through (J). The waveforms of the command voltage Vε* that appear wihin one cycle of the electric angle θe may include a slightly distorted sinusoidal waveform, a slightly distorted triangular waveform, or a slightly distorted N-gonal waveform although some harmonic components may be included in the sinusoidal waveform. This can also lead to moderate changes in the flux linkage. Harmonic core losses, vibration and noise of the SR motor can thereby be reduced.

In the fourth embodiment, when either of a positive voltage and a zero voltage is used as the applied voltage Vεr to the coil 22ε, the lower-arm switching element Sεp is turned on or off by means of the pulse-width modulation. When either of a negative voltage and a zero voltage is used as the applied voltage Vϵr to the coil 22ϵ, the upper-arm switching element Sϵp is turned on or off by means of the pulse-width modulation. Alternatively, when either of a positive voltage and a zero voltage is used as the applied voltage Vϵr to the coil 22ϵ, the upper-arm switching element Sϵp is turned on or off by means of the pulse-width modulation. When either of a negative voltage and a zero voltage is used as the applied voltage Vϵr to the coil 22ϵ, the lower-arm switching element Sϵp is turned on or off by means of the pulse-width modulation.

In the sixth embodiment, both when either of a positive voltage and a zero voltage is used as the applied voltage Vϵr to the coil 22ϵ and when either of a negative voltage and a zero voltage is used as the applied voltage Vϵr to the coil 22ϵ, the upper-arm switching element Sϵp is turned on or off. Alternatively, both when either of a positive voltage and a zero voltage is used as the applied voltage Vϵr to the coil 22ϵ and when either of a negative voltage and a zero voltage is used as the applied voltage Vϵr to the coil 22ϵ, the lower-arm switching element Sϵp may be turned on or off.

In the second embodiment, in step S30 of FIG. 14, it is determined whether or not the condition for the command torque Trq* and the condition for the electrical angular speed ω are both met. Alternatively, in step S30 of FIG. 14, it may be determined whether or not only one of the condition for the command torque Trq* and the condition for the electrical angular speed ω is met.

In the seventh embodiment, a zero voltage waveform is inserted during the energization period. Also in the tenth through fifteenth embodiments, a zero voltage waveform may be inserted during the energization period.

In each of the fourteenth and fifteenth embodiments, the command voltage Vϵ* is set such that the area Sp is greater than the area Sn. Alternatively, since the area Sn may become greater than the area Sp when the SR motor operates as an alternator, the command voltage Vϵ* may be set such that the area Sn is greater than the area Sp.

In each of the tenth through thirteenth embodiments, it is assumed that the flux linkage ψϵ is zero when the command voltage becomes zero. Alternatively, as in the fourteenth embodiment, the flux linkage ψϵ when the command voltage becomes zero may have a non-zero value due the effects of flux leakages.

In each of the first through fifteenth embodiments, the carrier signal is a triangular waveform signal. Alternatively, the carrier signal may be a sawtooth signal.

In each of the first through fifteenth embodiments, the diodes are used as the upper-arm and lower-arm rectifying elements. Other types of elements that can allow an electric current to pass in one direction while blocking current in the opposite direction may be used as the upper-arm and lower-arm rectifying elements.

In each of the first through fifteenth embodiments, the upper-arm and lower-arm switching elements are IGBTs. Alternatively, the upper-arm and lower-arm switching elements may be MOSFETs or bipolar transistors or the like.

In each of the first through fifteenth embodiments, the DC power supply is a battery. Alternatively, the DC power supply may be formed of, for example, an AC power source and a rectification circuit that converts an AC voltage outputted from the AC power source to a DC voltage.

In the first embodiment, since no detected current iϵr is used to generate the modulation signal, the U- through W-phase current sensors 32u through 32w may be removed.

The object to which the present invention is applied is not limited to the SR motor as a vehicle prime mover. Alternatively, the object to which the present invention is applied may be an SR motor as a vehicle-mounted accessory. Still alternatively, the object to which the present invention is applied may be an SR motor not mounted in the vehicle.

Many variations and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that variations and other embodiments are intended to be included within the scope of the appended claims. Although specific terms are employed herein, they are used in a generic and descriptive sense only and not for purposes of limitation.

What is claimed is:

1. An apparatus for controlling a switched reluctance motor with use of a power conversion circuit, the apparatus comprising:

a command voltage setter configured to set a command voltage for a coil of the motor, the command voltage being set to change gradually during either or both of a ramp-up period and a ramp-down period of the command voltage; and a voltage controller configured to control an applied voltage to the coil to the command voltage set by the command voltage setter by operating the power conversion circuit, wherein the command voltage setter is further configured to set the command voltage such that the command voltage has a continuous waveform for one cycle of electric angle of the motor and such that a zero voltage waveform is included as part of the waveform for one cycle of electric angle of the motor, and the command voltage setter is still further configured to perform all of:

a first process of increasing the command voltage gradually from zero to a first predetermined voltage which is positive during a first time period as the ramp-up period of the command voltage so that a flux linkage of the coil increases gradually from a value when the zero voltage waveform of the command voltage ends to a first predetermined value which is positive;

a second process of increasing the command voltage gradually from a second predetermined voltage which is negative to zero during a second time period as the ramp-up period of the command voltage so that the flux linkage of the coil decreases gradually from a second predetermined value which is positive to a value when the zero voltage waveform of the command voltage starts;

a third process of decreasing a third predetermined voltage which is positive to zero gradually during a third time period as the ramp-down period of the command voltage so that the flux linkage of the coil increases gradually from a third predetermined value equal to or greater than zero to a fourth predetermined value greater than the third predetermined value;

a fourth process of decreasing the command voltage gradually from zero to a fourth predetermined voltage which is negative during a fourth time period as the ramp-down period of the command voltage so that the flux linkage of the coil decreases gradually from a fifth predetermined value which is positive to a sixth predetermined value which is equal to or greater than zero and is less than the fifth predetermined value; and a fifth process of setting the zero voltage waveform, the first to fifth processes are to be performed during one cycle of electric angle of the motor in a sequential order of the first, third, fourth, second, and fifth proceeses, the first and third predetermined values are the same positive value, the first and third predetermined voltages are at the same value, the fourth and fifth predetermined values are the same value, the sixth and second predetermined values are the same positive value, and the fourth and second predetermined voltages are at the same value.

2. The apparatus of claim 1, wherein the command voltage setter is further configured to set the command voltage such that a waveform of the command voltage for one cycle of electric angle of the motor includes at least one of sinusoidal and polygonal waveforms.

3. The apparatus of claim 1, wherein the command voltage setter is further configured to set the command voltage such that, during an energization period, in which the coil is energized, included within one cycle of an electric angle of the motor, a first waveform of the command voltage is directly followed by a second waveform of the command voltage and the first and second waveforms of the command voltage are symmetrical about an intersection point of a first axis line defining a zero voltage and a second axis line perpendicular to the first axis line and passing through a midpoint of the energization period.

4. The apparatus of claim 1, wherein the command voltage setter is further configured to set the command voltage such that, during an energization period, in which the coil is energized, included within one cycle of an electric angle of the motor, an absolute value of a difference between an area of a region enclosed by an axis line defining a zero command voltage and a waveform of the command voltage on the positive command voltage side of the axis line and an area of a region enclosed by the axis line and the waveform of the command voltage on the negative command voltage side of the axis line is equal to or less than a predefined value.

5. The apparatus of claim 1, wherein the power conversion circuit comprises:

an upper-arm switching element electrically connected between one of terminals of the coil and a positive terminal of a DC power supply;

a lower-arm switching element electrically connected between the other of terminals of the coil and a negative terminal of the DC power supply;

an upper-arm rectifying element electrically connecting a junction between the coil and the lower-arm switching element and one of the terminals of the upper-arm switching element opposite a junction between the coil and the upper-arm switching element, the upper-arm rectifying element allowing an electric current to pass in a direction from the lower-arm switching element to the upper-arm switching element while blocking current in the opposite direction; and a lower-arm rectifying element electrically connecting the junction between the coil and the upper-arm switching element and one of the terminals of the lower-arm switching element opposite the junction between the coil and the lower-arm switching element, the lower-arm rectifying element allowing an electric current to pass in a direction from the lower-arm switching element to the upper-arm switching element while blocking current in the opposite direction, wherein the command voltage setter is configured to generate a modulation signal that is the command voltage divided by an output voltage of the DC power supply, the voltage controller is configured to control the applied voltage to the command voltage by turning on or off at least one of the upper-arm switching element and the lower-arm switching element by pulse-width modulation based on determination of whether or not the modulation signal is equal to or greater than a carrier signal.

6. The apparatus of claim 1, further comprising an up-down converter electrically connected to the input side of the power conversion circuit, the up-down converter being operable to variably set a DC voltage applied to the power conversion circuit, wherein the voltage controller is configured to control the applied voltage to the coil to the command voltage by pulse-amplitude modulation implemented by operating the power conversion circuit and the up-down converter.

7. The apparatus of claim 1, further comprising a speed-range permitter configured to, when an electrical angular speed of the motor is equal to or less than a prescribed speed, permit the voltage controller to control the applied voltage to the coil to the command voltage.

8. The apparatus of claim 1, further comprising a torque-range permitter configured to, when a command torque for the motor is equal to or less than a prescribed torque, permit the voltage controller to control the applied voltage to the coil to the command voltage.

9. The apparatus of claim 1, wherein the command voltage setter is configured to set the command voltage for the coil without setting a command value of current flowing through the coil.

10. The apparatus of claim 1, wherein the command voltage setter is configured to set the command voltage such that a zero voltage waveform inserted between the third time period and the fourth time period during one cycle of the electric angle of the motor.

11. The apparatus of claim 4, wherein the command voltage setter is further configured to set the command voltage such that the area of the region on the positive command voltage side of the axis line is greater than the area of the region on the negative command voltage side of the axis line.

12. The apparatus of claim 5, wherein the voltage controller is further configured such that the applied voltage to the coil is a positive voltage from the DC power supply, a zero voltage, or a negative voltage from the DC power supply.

13. The apparatus of claim 12, wherein the voltage controller is further configured to:

when the modulation signal is equal to or greater than 0, turn on or off one of the upper-arm switching element and the lower-arm switching element by the pulse-width modulation with the other of the upper-arm and lower-arm switching elements being kept on, so that the applied voltage to the coil is either of the positive voltage from the DC power supply and the zero voltage; and when the modulation signal is less than 0, turn on or off one of the upper-arm switching element and the lower-arm switching element by the pulse-width modulation with the other of the upper-arm and lower-arm switching elements being kept off, so that the applied voltage to the coil is either of the zero voltage and the negative voltage from the DC power supply.

14. The apparatus of claim 12, wherein the command voltage setter is further configured to set the command voltage such that, during an energization period, in which the coil is energized, included within one cycle of an electric angle of the motor, a first waveform of the command voltage is directly followed by a second waveform of the command voltage and the first and second waveforms of the command voltage are symmetrical about an intersection point of a first axis line defining a zero voltage and a second axis line perpendicular to the first axis line and passing through a midpoint of the energization period, and the voltage controller is further configured to:

during a first time period in which the command voltage has the first waveform, turn on or off one of the upper-arm switching element and the lower-arm switching element by the pulse-width modulation with the other of the upper-arm and lower-arm switching elements being kept on, so that the applied voltage to the coil is either of the positive voltage from the DC power supply and the zero voltage; and during a second time period in which the command voltage has the second waveform, turn on or off one of the upper-arm switching element and the lower-arm switching element by the pulse-width modulation with the other of the upper-arm and lower-arm switching elements being kept off, so that the applied voltage to the coil is either of the zero voltage and the negative voltage from the DC power supply.

15. The apparatus of claim 13, wherein the voltage controller is further configured to, when the applied voltage to the coil is either of the positive voltage from the DC power supply and the zero voltage, turn on or off one of the upper-arm switching element and the lower-arm switching element by the pulse-width modulation, and when the applied voltage to the coil is either of the zero voltage and the negative voltage from the DC power supply, turn on or off the same one of the upper-arm switching element and the lower-arm switching element.

16. The apparatus of claim 13, wherein the voltage controller is further configured to, when the applied voltage to the coil is either of the positive voltage from the DC power supply and the zero voltage, turn on or off one of the upper-arm switching element and the lower-arm switching element by the pulse-width modulation, and when the applied voltage to the coil is either of the zero voltage and the negative voltage from the DC power supply, turn on or off the other one of the upper-arm switching element and the lower-arm switching element by the pulse-width modulation.

17. The apparatus of claim 14, wherein the voltage controller is further configured to, when the applied voltage to the coil is either of the positive voltage from the DC power supply and the zero voltage, turn on or off one of the upper-arm switching element and the lower-arm switching element by the pulse-width modulation, and when the applied voltage to the coil is either of the zero voltage and the negative voltage from the DC power supply, turn on or off the same one of the upper-arm switching element and the lower-arm switching element.

18. The apparatus of claim 14, wherein the voltage controller is further configured to, when the applied voltage to the coil is either of the positive voltage from the DC power supply and the zero voltage, turn on or off one of the upper-arm switching element and the lower-arm switching element by the pulse-width modulation, and when the applied voltage to the coil is either of the zero voltage and the negative voltage from the DC power supply, turn on or off the other one of the upper-arm switching element and the lower-arm switching element by the pulse-width modulation.

19. An apparatus for controlling a switched reluctance motor with use of a power conversion circuit, the apparatus comprising:

a command voltage setter configured to set a command voltage for a coil of the motor, the command voltage being set to change gradually during either or both of a ramp-up period and a ramp-down period of the command voltage; and a voltage controller configured to control an applied voltage to the coil to the command voltage set by the command voltage setter by operating the power conversion circuit, wherein the command voltage setter is further configured to perform at least one of:

a first process of increasing the command voltage gradually from zero to a first predetermined voltage which is positive during a first time period as the ramp-up period of the command voltage so that a flux linkage of the coil increases gradually from a value when the command voltage becomes zero to a first predetermined value which is positive;

a second process of increasing the command voltage gradually from a second predetermined voltage which is negative to zero during a second time period as the ramp-up period of the command voltage so that the flux linkage of the coil decreases gradually from a second predetermined value which is positive to a value when the command voltage becomes zero;

a third process of decreasing a third predetermined voltage which is positive to zero gradually during a third time period as the ramp-down period of the command voltage so that the flux linkage of the coil increases gradually from a third predetermined value equal to or greater than zero to a fourth predetermined value greater than the third predetermined value; and a fourth process of decreasing the command voltage gradually from zero to a fourth predetermined voltage which is negative during a fourth time period as the ramp-down period of the command voltage so that the flux linkage of the coil decreases gradually from a fifth predetermined value which is positive to a sixth predetermined value which is equal to or greater than zero and is less than the fifth predetermined value;

wherein the command voltage setter is further configured to set the command voltage such that, during an energization period, in which the coil is energized, included within one cycle of an electric angle of the motor, an absolute value of a difference between an area of a region enclosed by an axis line defining a zero command voltage and a waveform of the command voltage on the positive command voltage side of the axis line and an area of a region enclosed by the axis line and the waveform of the command voltage on the negative command voltage side of the axis line is equal to or less than a predefined value; and wherein the command voltage setter is further configured to set the command voltage such that the area of the region on the positive command voltage side of the axis line is greater than the area of the region on the negative command voltage side of the axis line.

* * * * *